(12) United States Patent
Sekine

(10) Patent No.: US 11,874,440 B2
(45) Date of Patent: Jan. 16, 2024

(54) IMAGING LENS

(71) Applicant: TOKYO VISIONARY OPTICS CO., LTD., Tokyo (JP)

(72) Inventor: Yukio Sekine, Sukagawa (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 432 days.

(21) Appl. No.: 17/038,122

(22) Filed: Sep. 30, 2020

(65) Prior Publication Data

US 2021/0011262 A1 Jan. 14, 2021

Related U.S. Application Data

(63) Continuation of application No. 16/156,754, filed on Oct. 10, 2018, now Pat. No. 11,150,445.

(30) Foreign Application Priority Data

Oct. 10, 2017 (JP) ................................. 2017-196848

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
(Continued)

(56) References Cited

U.S. PATENT DOCUMENTS

2014/0376105 A1 12/2014 Sekine
2015/0000957 A1 1/2015 Koppe et al.
(Continued)

FOREIGN PATENT DOCUMENTS

CN 204028445 U 12/2014
CN 106950681 A 7/2017
(Continued)

*Primary Examiner* — Joseph P Martinez
*Assistant Examiner* — Grant A Gagnon
(74) *Attorney, Agent, or Firm* — Hamre, Schumann, Mueller & Larson, P.C.

(57) ABSTRACT

There is provided a compact and high-resolution imaging lens at a low cost.
The imaging lens comprises in order from an object side to an image side, a first lens having positive refractive power and a convex surface facing the object side near an optical axis, a second lens having negative refractive power and a meniscus shape having the convex surface facing the object side near the optical axis, a third lens having the positive or the negative refractive power, a fourth lens having the convex surface facing the image side near the optical axis, a fifth lens having the positive refractive power, a sixth lens having the positive refractive power, and a seventh lens having the negative refractive power and a concave surface facing the image side near the optical axis, the image side surface of said seventh lens is formed as an aspheric surface which changes to the convex surface at a peripheral area, the object-side surface of said fifth lens has the convex surface facing the object side near the optical axis, all lenses are single lenses arranged with an interval between lenses adjacent to each other, and below conditional expressions (1), (2) and (3) are satisfied:

$1.50 < Nd1 < 1.60$ (1)

$-8.0 < f2/f < -2.0$ (2)

$0.3 < t2/t3 < 3.3$ (3)

(Continued)

where

Nd1: refractive index at d-ray of the first lens, f: focal length of the overall optical system, f2: focal length of the second lens, t2: distance along the optical axis from the image-side surface of the second lens to the object-side surface of the third lens, and t3: distance along the optical axis from the image-side surface of the third lens to the object-side surface of the fourth lens.

20 Claims, 14 Drawing Sheets

(58) Field of Classification Search
USPC .......................................................... 359/708
See application file for complete search history.

(56) References Cited

U.S. PATENT DOCUMENTS

| 2015/0378131 | A1 | 12/2015 | Tang et al. |
| 2016/0033742 | A1 | 2/2016 | Huang |
| 2016/0131874 | A1 | 5/2016 | Tang et al. |
| 2016/0299319 | A1 | 10/2016 | Tang et al. |
| 2017/0059825 | A1 | 3/2017 | Tang et al. |
| 2017/0059826 | A1 | 3/2017 | Tang et al. |
| 2019/0094494 | A1 | 3/2019 | Hsu et al. |
| 2019/0121100 | A1 | 4/2019 | Song et al. |
| 2021/0048623 | A1 | 2/2021 | Dai et al. |

FOREIGN PATENT DOCUMENTS

| CN | 107367827 A | 11/2017 |
| JP | 2012155223 | 8/2012 |
| TW | M490015 U | 11/2014 |
| TW | 201708867 A | 3/2017 |
| TW | 201708868 A | 3/2017 |
| TW | I640798 B | 11/2018 |

IMAGING LENS

The present application is based on and claims priority of a Japanese patent application No. 2017-196848 filed on Oct. 10, 2017, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact imaging device.

Description of the Related Art

In recent years, it becomes common that camera function is mounted in many information terminal equipment. It is expected that development of various products with the camera function pursuing convenience and satisfaction of customers will continue accordingly.

The imaging lens used in such equipment is required to be compact and to have high-resolution performance, and spread of the imaging lens and reduction in cost are also required.

For Example, as a conventional imaging lens aiming the high-resolution performance, the imaging lens disclosed in the following Patent Document 1 has been known.

Patent Document 1 (JP2012-155223A) discloses an imaging lens comprising, in order from an object side, a first lens having a biconvex shape, a second lens having a biconcave shape and being cemented to the first lens, a third lens having negative refractive power and a meniscus shape having a convex surface facing the object side, a fourth lens having positive refractive power and the meniscus shape having a concave surface facing the object side, a fifth lens having the negative refractive power and the meniscus shape having a convex surface facing the object side, a sixth lens having the biconvex shape, and a seventh lens having the biconcave shape. In such imaging lens, a front group comprises the first lens to the fourth lens and a rear group comprises the fifth lens to the seventh lens. The ratio of focal lengths of the front group to that of the rear group is controlled in a predetermined range, therefore proper aberration corrections are realized while reducing a size of an optical system.

SUMMARY OF THE INVENTION

Regarding the imaging lens having a seven-lens configuration disclosed in the above-described Patent Document 1, F-number is relatively small and the aberrations are properly corrected, however, sufficient reduction in size is not achieved. Furthermore, the configuration including a glass lens or a cemented lens has difficulty in manufacturing process, and reduction in cost is also difficult.

The present invention has been made in view of the above-described problems, and an object of the present invention is to provide an imaging lens which is compact and bright, and has high resolution at a low cost.

Regarding terms used in the present invention, a term of a convex surface, a concave surface or a plane surface of lens surfaces implies that a shape of the lens surface near an optical axis (paraxial portion), and a term of refractive power implies the refractive power near the optical axis. The pole point implies an off-axial point on an aspheric surface at which a tangential plane intersects the optical axis perpendicularly. The total track length is defined as a distance along the optical axis from an object-side surface of an optical element located closest to the object to an image plane. The total track length and the back focus is determined under a condition that thickness of an IR cut filter or a cover glass which may be arranged between the imaging lens and the image plane is regarded as an air.

An imaging lens according to the present invention comprises in order from an object side to an image side, a first lens having positive refractive power and a convex surface facing the object side near an optical axis, a second lens having negative refractive power and a meniscus shape having the convex surface facing the object side near the optical axis, a third lens having the positive or the negative refractive power, a fourth lens having the convex surface facing the image side near the optical axis, a fifth lens having the positive refractive power, a sixth lens having the positive refractive power, and a seventh lens having the negative refractive power and a concave surface facing the image side near the optical axis. The image side surface of the seventh lens is formed as an aspheric surface which changes to the convex surface at a peripheral area. All lenses are single lenses arranged with an interval between lenses adjacent to each other.

In the imaging lens having the above-described configuration, the first lens, the fifth lens and the sixth lens achieve low-profileness by the positive refractive power of each lens. The second lens properly corrects chromatic aberration and spherical aberration occurred at the first lens by the negative refractive power. An image-side surface of the fourth lens is the convex surface facing the image side near the optical axis, and therefore the total track length is suppressed to be small and a light ray incident angle to the fifth lens is made appropriate. The image-side surface of the seventh lens is the concave surface facing the image side near the optical axis, and is the aspheric surface having a pole point at an area apart from the optical axis. Therefore, back focus is secured near the optical axis by the negative refractive power, and the light ray incident angle to the peripheral area is appropriately controlled. Thereby, field curvature is properly corrected and the light ray incident angle to an image sensor is made appropriate. Furthermore, the all lenses are single lenses arranged with intervals therebetween, therefore manufacturing becomes facilitated. In the imaging lens having the above-described configuration, it is preferable that the object-side surface of the fifth lens is the convex surface facing the object side near the optical axis, and in this case, astigmatism and field curvature can be properly corrected.

According to the imaging lens having the above-described configuration, it is preferable that a below conditional expression (1) is satisfied:

$$1.50 < Nd1 < 1.60 \qquad (1)$$

Where
Nd1: refractive index at d-ray of the first lens.

The conditional expression (1) defines an appropriate range of the refractive power at d-ray of the first lens. The range of the conditional expression (1) becomes a condition for selecting an inexpensive plastic material.

According to the imaging lens having the above-described configuration, it is preferable that a below conditional expression (2) is satisfied:

$$-8.0 < f2/f < -2.0 \qquad (2)$$

where f2: focal length of the second lens, and f: focal length of the overall optical system.

The conditional expression (2) defines an appropriate range of the negative refractive power of the second lens. By satisfying the conditional expression (2), spherical aberration and the chromatic aberration can be properly corrected.

According to the imaging lens having the above-described configuration, it is preferable that a below conditional expression (3) is satisfied:

$$0.3 < t2/t3 < 3.3 \quad (3)$$

where t2: distance along the optical axis from the image-side surface of the second lens to the object-side surface of the third lens, and t3: distance along the optical axis from the image-side surface of the third lens to the object-side surface of the fourth lens.

The conditional expression (3) defines an appropriate ratio of an interval along the optical axis between the second lens and the third lens, and an interval along the optical axis between the third lens and the fourth lens. By satisfying the conditional expression (3), each interval of the lenses becomes appropriate and the total track length can be suppressed to be small.

According to the imaging lens having the above-described configuration, it is preferable that the fourth lens has the negative refractive power near the optical axis.

The chromatic aberration and the spherical aberration can be properly corrected by the fourth lens having the negative refractive power.

According to the imaging lens having the above-described configuration, it is preferable that composite refractive power of the fifth lens, the sixth lens and the seventh lens is positive, and more preferable that a below conditional expression (4) is satisfied:

$$3.0 < f567/f < 10.0 \quad (4)$$

where f567: composite focal length of the fifth lens, the sixth lens and the seventh lens, and f: focal length of the overall optical system of the imaging lens.

The conditional expression (4) defines an appropriate range of the composite refractive power of the fifth lens, the sixth lens and the seventh lens. When the fifth lens has the positive refractive power, the sixth lens has the positive refractive power and the seventh lens has the negative refractive power, and each refractive power of these three lenses is distributed so that the composite refractive power becomes positive, the total track length can be suppressed to be small. Furthermore, by satisfying the conditional expression (4), the field curvature and distortion can be properly corrected while securing back focus.

According to the imaging lens having the above-described configuration, it is preferable that a below conditional expression (5) is satisfied:

$$-10.0 < (r9+r10)/(r9-r10) < -0.5 \quad (5)$$

where r9: paraxial curvature radius of the object-side surface of the fifth lens, and r10: paraxial curvature radius of the image-side surface of the fifth lens.

The conditional expression (5) defines shapes of the object-side surface and the image-side surface of the fifth lens by ratio of paraxial curvature radii. By satisfying the conditional expression (5), the low-profileness can be easily achieved, and the distortion, the chromatic aberration, the astigmatism and the field curvature can be properly corrected.

According to the imaging lens having the above-described configuration, it is preferable that a below conditional expression (6) is satisfied:

$$1.0 < |f23|/f < 4.5 \quad (6)$$

where f23: composite focal length of the second lens and the third lens, and f: focal length of the overall optical system of the imaging lens.

The conditional expression (6) defines an appropriate range of the composite refractive power of the second lens and the third lens. When a value is below the upper limit of the conditional expression (6), the chromatic aberration can be properly corrected. On the other hand, when the value is above the lower limit of the conditional expression (6), the field curvature and the distortion can be properly corrected.

According to the imaging lens having the above-described configuration, it is preferable that a below conditional expression (7) is satisfied:

$$0.01 < t3/f < 0.15 \quad (7)$$

where t3: distance along the optical axis from the image-side surface of the third lens to the object-side surface of the fourth lens, and f: focal length of the overall optical system of the imaging lens.

The conditional expression (7) defines an appropriate range of the interval along the optical axis between the third lens and the fourth lens. By satisfying the conditional expression (7), the total track length can be suppressed to be small.

According to the imaging lens having the above-described configuration, it is preferable that below conditional expressions (8) and (9) are satisfied:

$$50 < vd1 < 60 \quad (8)$$

$$15 < vd2 < 25 \quad (9)$$

where vd1: abbe number at d-ray of the first lens, and vd2: abbe number at d-ray of the second lens.

The conditional expressions (8) and (9) define appropriate ranges of the abbe numbers at d-ray of the first lens and the second lens. By satisfying the conditional expressions (8) and (9), axial chromatic aberration can be properly corrected.

According to the imaging lens having the above-described configuration, it is preferable that below conditional expression (10) is satisfied:

$$15 < vd4 < 25 \quad (10)$$

where vd4: abbe number at d-ray of the fourth lens.

The conditional expression (10) defines an appropriate range of the abbe numbers at d-ray of the fourth lens. By satisfying the conditional expression (10), the chromatic aberration of magnification can be properly corrected.

According to the imaging lens having the above-described configuration, it is preferable that below conditional expressions (11), (12) and (13) are satisfied:

$$50 < vd5 < 60 \quad (11)$$

$$50 < vd6 < 60 \quad (12)$$

$$50 < vd7 < 60 \quad (13)$$

where
vd5: abbe number at d-ray of the fifth lens,
vd6: abbe number at d-ray of the sixth lens, and
vd7: abbe number at d-ray of the seventh lens.

By satisfying the conditional expressions (11), (12) and (13), an inexpensive plastic material can be selected.

According to the imaging lens having the above-described configuration, it is preferable that a below conditional expression (14) is satisfied:

$$0.05 < d1/f < 0.30 \quad (14)$$

where
d1: thickness along the optical axis of the first lens, and
f: focal length of the overall optical system of the imaging lens.

The conditional expression (14) defines an appropriate range of the thickness along the optical axis of the first lens. When a value is below the upper limit of the conditional expression (14), the thickness along the optical axis of the first lens is prevented from being excessively large, and securing the air gap on the image side of the first lens is facilitated. Thereby, the low-profileness can be maintained. On the other hand, when the value is above the lower limit of the conditional expression (14), the thickness along the optical axis of the first lens is prevented from being excessively small, and the formability of the lens is improved.

According to the imaging lens having the above-described configuration, it is preferable that a below conditional expression (15) is satisfied:

$$1.0 < f12/f < 3.0 \quad (15)$$

where
f12: composite focal length of the first lens and the second lens, and
f: focal length of the overall optical system of the imaging lens.

The conditional expression (15) defines an appropriate range of the composite refractive power of the first lens and the second lens. When a value is below the upper limit of the conditional expression (15), positive composite refractive power of the first lens and the second lens is made appropriate, and the low-profileness can be achieved. On the other hand, when the value is above the lower limit of the conditional expression (15), the spherical aberration and coma aberration can be properly corrected.

According to the imaging lens having the above-described configuration, it is preferable that a below conditional expression (16) is satisfied:

$$2.5 < |f34|/f < 12.0 \quad (16)$$

where
f34: composite focal length of the third lens and the fourth lens, and
f: focal length of the overall optical system of the imaging lens.

The conditional expression (16) defines an appropriate range of the composite refractive power of the third lens and the fourth lens. When a value is below the upper limit of the conditional expression (16), the chromatic aberration can be properly corrected. On the other hand, when the value is above the lower limit of the conditional expression (16), the astigmatism and the distortion can be properly corrected.

According to the imaging lens having the above-described configuration, it is preferable that a below conditional expression (17) is satisfied:

$$1.7 < f5/f < 4.5 \quad (17)$$

where
f5: focal length of the fifth lens, and
f: focal length of the overall optical system.

The conditional expression (17) defines an appropriate range of the refractive power of the fifth lens. When a value is below the upper limit of the conditional expression (17), the positive refractive power of the fifth lens becomes appropriate and the low-profileness can be achieved. On the other hand, when the value is above the lower limit of the conditional expression (17), the coma aberration, the astigmatism and the distortion can be properly corrected.

According to the imaging lens having the above-described configuration, it is preferable that a below conditional expression (18) is satisfied:

$$0.1 < r1/r2 < 0.7 \quad (18)$$

where
r1: paraxial curvature radius of the object-side surface of the first lens, and
r2: paraxial curvature radius of the image-side surface of the first lens.

The conditional expression (18) defines shapes of the object-side surface and the image-side surface of the first lens by ratio of paraxial curvature radii. By satisfying the conditional expression (18), the spherical aberration and the distortion can be properly corrected.

According to the imaging lens having the above-described configuration, it is preferable that an aperture stop is arranged closer to the object than the object side of the second lens.

By arranging the aperture stop closer to the object, an exit pupil can be located away from an image plane. Thereby, telecentricity of the image side can be secured and decrease in light quantity at the peripheral area can be suppressed.

According to the imaging lens having the above-described configuration, it is preferable that all lenses from the first lens to the seventh lens have at least one aspheric surface, respectively, and more preferable that both surfaces of all lenses from the first lens to the seventh lens are aspheric surfaces.

By using many aspheric surfaces, aberration corrections at the peripheral area can be especially facilitated. Furthermore, it is preferable that all lenses are made of the plastic material by which the aspheric surfaces can be easily formed. It is also preferable that at least two lenses of the fifth lens, the sixth lens and the seventh lens have aspheric surface(s) having at least one pole point on either the object side or the image side, or both of the object side and the image side. Such shapes using the aspheric surfaces facilitates the aberration corrections at the peripheral area.

Effect of Invention

According to the present invention, there can be provided an imaging lens which is compact and bright, and has high resolution at a low cost.

It is not necessary to satisfy all conditional expressions (1) to (18). By satisfying the conditional expression individually, operational advantage corresponding to each conditional expression can be obtained.

DETAILED DESCRIPTION OF THE PREFERRED EMBODIMENT

Hereinafter, the preferred embodiment of the present invention will be described in detail referring to the accompanying drawings.

FIGS. 1, 3, 5, 7, 9, 11 and 13 are schematic views of the imaging lenses in Examples 1 to 7 according to the embodiments of the present invention, respectively.

Figure 1:
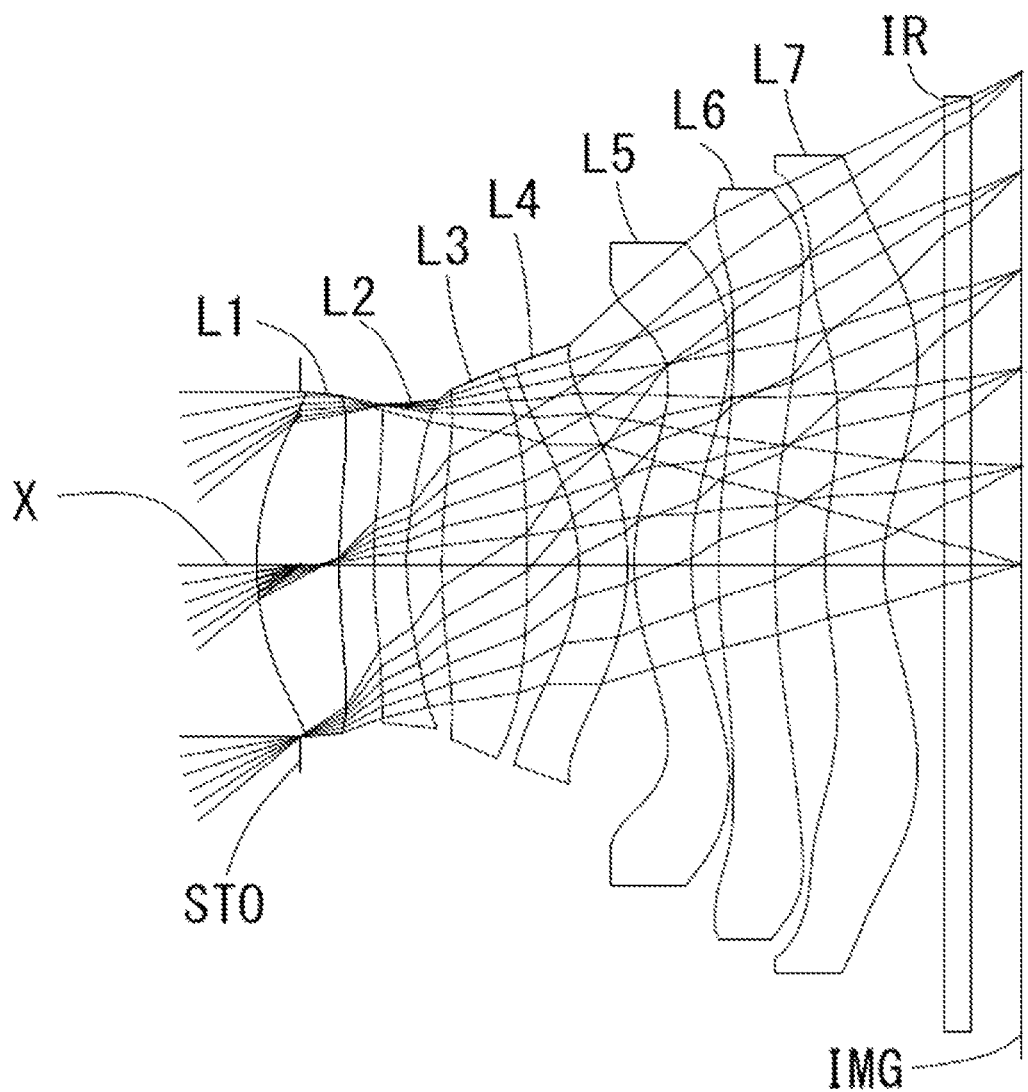
FIG. 1 is a schematic view showing a general configuration of an imaging lens in Example 1 according to the present invention.

As shown in FIG. 1, the imaging lens according to the present embodiments comprises in order from an object side to an image side, a first lens L1 having positive refractive power and a convex surface facing the object side near an optical axis X, a second lens L2 having negative refractive power and a meniscus shape having the convex surface facing the object side near the optical axis X, a third lens L3 having the positive or the negative refractive power, a fourth lens L4 having the convex surface facing the image side near the optical axis X, a fifth lens L5 having the positive refractive power, a sixth lens L6 having the positive refractive power, and a seventh lens L7 having the negative refractive power and a concave surface facing the image side near the optical axis X. The image side surface of the seventh lens L7 is formed as an aspheric surface which changes to the convex surface at a peripheral area. All lenses are single lenses arranged with an interval between lenses adjacent to each other.

A filter IR such as an IR cut filter and a cover glass is arranged between the seventh lens L7 and an image plane IMG (namely, an image plane of the image sensor). The filter IR is omissible.

An aperture stop STO is arranged between a vertex position of the object-side surface of the first lens L1 and a periphery of the object-side surface.

The first lens L1 has the meniscus shape having the convex surface facing the object side and the concave surface facing the image side near the optical axis X. Therefore, coma aberration, field curvature and distortion can be properly corrected.

The second lens L2 has the meniscus shape having the convex surface facing the object side and the concave surface facing the image side near the optical axis X. Therefore, axial chromatic aberration, high-order spherical aberration, the coma aberration and the field curvature can be properly corrected.

The third lens L3 has positive refractive power and a biconvex shape having the convex surfaces facing the object side and the image side near the optical axis X. The field curvature and the coma aberration can be properly corrected by aspheric surfaces on both sides. A shape of the third lens L3 is not limited to the biconvex shape. In the Example shown in FIG. 11, the third lens L3 has the meniscus shape having the convex surface facing the object side and the concave surface facing the image side near the optical axis X. In this case, the coma aberration, the field curvature and the distortion can be properly corrected. Furthermore, the refractive power of the third lens L3 may be negative as shown in the Example in FIG. 13. In this case, the third lens L3 has a biconcave shape having the concave surfaces facing the object side and the image side near the optical axis X, therefore the chromatic aberration can be properly corrected.

The fourth lens L4 has the meniscus shape having the concave surface facing the object side and the convex surface facing the image side near the optical axis X. The convex surface facing the image side controls light ray incident angle to the fifth lens L5 to be appropriate, and contributes to shortening of total track length. Furthermore, the fourth lens L4 has the negative refractive power so as to diverge light ray emitted from the third lens L3 and enter the same into the fifth lens L5. However, also the positive refractive power may be adoptable if an appropriate paraxial curvature radius and the aspheric surface are provided.

The fifth lens L5 has the meniscus shape having the convex surface facing the object side and the concave surface facing the image side near the optical axis X, and astigmatism, the field curvature and the distortion can be properly corrected. The shape of the fifth lens L5 is not limited to the above-described shape. In the Example shown in FIG. 11, the fifth lens L5 has the biconvex shape having the convex surfaces facing both of object side and the image side near the optical axis X. In this case, the positive refractive power on the both surfaces are favorable to low-profileness.

The sixth lens L6 has the meniscus shape having the convex surface facing the object side and the concave surface facing the image side near the optical axis X, and the astigmatism, the field curvature and the distortion can be properly corrected. The shape of the sixth lens L6 is not limited to the above-described shape. In the Examples shown in FIGS. 3, 5, 7, 9, 11 and 13, the sixth lens L6 has the biconvex shape having the convex surfaces facing both of the object side and the image side near the optical axis X.

In this case, the positive refractive power on the both surfaces are favorable to low-profileness.

The seventh lens L7 has the meniscus shape having the convex surface facing the object side and the concave surface facing the image side near the optical axis X, and the field curvature and the distortion can be properly corrected. The shape of the seventh lens L7 is not limited to the above-described shape. In the Examples shown in FIGS. 11 and 13, the seventh lens L7 has the biconcave shape having the concave surfaces facing both of the object side and the image side near the optical axis X. Such shape is favorable to correction of the chromatic aberration.

The image-side surface of the seventh lens L7 is the aspheric surface which changes to the convex surface at an area apart from the optical axis X. Therefore, back focus is secured near the optical axis X by the negative refractive power, and the light ray incident angle to the peripheral area is appropriately controlled. Thereby, the field curvature can be properly corrected, and the light ray incident angle to the image sensor is made appropriate.

Regarding the imaging lens according to the present embodiments, it is preferable that all lenses of the first lens L1 to the seventh lens L7 are single lenses which are not cemented each other. Configuration with only the single lenses can use many aspheric surfaces. In the present embodiment, all surfaces of the lenses have aspheric surfaces and proper correction of the aberrations can be realized. Furthermore, in comparison with a case using the cemented lenses, workload for cementing is unnecessary, and manufacturing in low cost becomes available.

Regarding the imaging lens according to the present embodiments, a plastic material is used for all of the lenses, and mass production in a low cost can be realized.

It is preferable that all surfaces of the lenses are aspheric surfaces, however, in accordance with required performance, spherical surfaces may be used which are manufactured easily.

The imaging lens according to the present embodiments shows preferable effect by satisfying the below conditional expressions (1) to (18).

$$1.50 < Nd1 < 1.60 \quad (1)$$

$$-8.0 < f2/f < -2.0 \quad (2)$$

$$0.3 < t2/t3 < 3.3 \quad (3)$$

$$3.0 < f567/f < 10.0 \quad (4)$$

$$-10.0 < (r9+r10)/(r9-r10) < -0.5 \quad (5)$$

$$1.0 < |f23|/f < 4.5 \quad (6)$$

$$0.01 < t3/f < 0.15 \quad (7)$$

$$50 < vd1 < 60 \quad (8)$$

$$15 < vd2 < 25 \quad (9)$$

$$15 < vd4 < 25 \quad (10)$$

$$50 < vd5 < 60 \quad (11)$$

$$50 < vd6 < 60 \quad (12)$$

$$50 < vd7 < 60 \quad (13)$$

$$0.05 < d1/f < 0.30 \quad (14)$$

$$1.0 < f12/f < 3.0 \quad (15)$$

$$2.5 < |f34|/f < 12.0 \quad (16)$$

$$1.7 < f5/f < 4.5 \quad (17)$$

$$0.1 < r1/r2 < 0.7 \quad (18)$$

where
Nd1: refractive index at d-ray of the first lens L1,
vd1: abbe number at d-ray of the first lens L1,
vd2: abbe number at d-ray of the second lens L2,
vd4: abbe number at d-ray of the fourth lens L4,
vd5: abbe number at d-ray of the fifth lens L5,
vd6: abbe number at d-ray of the sixth lens L6,
vd7: abbe number at d-ray of the seventh lens L7,
t2: distance along the optical axis X from the image-side surface of the second lens L2 to the object-side surface of the third lens L3,
t3: distance along the optical axis X from the image-side surface of the third lens L3 to the object-side surface of the fourth lens L4,
d1: thickness along the optical axis X of the first lens L1,
f: focal length of the overall optical system,
f2: focal length of the second lens L2,
f5: focal length of the fifth lens L5,
f12: composite focal length of the first lens L1 and the second lens L2,
f23: composite focal length of the second lens L2 and the third lens L3,
f34: composite focal length of the third lens L3 and the fourth lens L4,
f567: composite focal length of the fifth lens L5, the sixth lens L6, and the seventh lens L7,
r1: paraxial curvature radius of the object-side surface of the first lens L1,
r2: paraxial curvature radius of the image-side surface of the first lens L1,
r9: paraxial curvature radius of the object-side surface of the fifth lens L5, and
r10: paraxial curvature radius of the image-side surface of the fifth lens L5.

The imaging lens according to the present embodiments shows further preferable effect by satisfying the below conditional expressions (1a) to (18a).

$$1.52 < Nd1 < 1.57 \quad (1a)$$

$$-7.1 f2/f < -2.5 \quad (2a)$$

$$0.5 < t2/t3 < 3.0 \quad (3a)$$

$$3.2 < f567/f < 7.5 \quad (4a)$$

$$-8.7 < (r9+r10)/(r9-r10) < -0.7 \quad (5a)$$

$$1.5 < |f23|/f < 3.9 \quad (6a)$$

$$0.02 < t3/f < 0.12 \quad (7a)$$

$$53 < vd1 < 58 \quad (8a)$$

$$17 < vd2 < 23 \quad (9a)$$

$$17 < vd4 < 24 \quad (10a)$$

$$53 < vd5 < 58 \quad (11a)$$

$$53 < vd6 < 58 \quad (12a)$$

$$53 < vd7 < 58 \quad (13a)$$

$$0.09 < d1/f < 0.23 \quad (14a)$$

$$1.1 < f12/f < 2.6 \quad (15a)$$

$$3.0 < |f34|/f < 11.0 \quad (16a)$$

$$1.8 < f5/f < 4.3 \quad (17a)$$

$$0.2 < r1/r2 < 0.6 \quad (18a)$$

The signs in the above conditional expressions have the same meanings as those in the paragraph before the preceding paragraph.

In this embodiment, the aspheric shapes of the surfaces of the aspheric lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} + A_{18} H^{18} + A_{20} H^{20}$$

Equation 1

Next, examples of the imaging lens according to this embodiment will be explained. In each example, f denotes the focal length of the overall optical system of the imaging lens, Fno denotes a F-number, ω denotes a half field of view, ih denotes a maximum image height, and TTL denotes total track length. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

| Unit mm |
|---|
| f = 4.79 |
| Fno = 1.70 |
| ω(°) = 39.5 |
| ih = 4.03 |
| TTL = 6.20 |

Surface Data

| Surface Number i | Curvature Radius r | Surface Distance d | Refractive Index Nd | Abbe Number vd | Focal Length |
|---|---|---|---|---|---|
| (Object) | Infinity | Infinity | | | |
| 1 (Stop) | Infinity | −0.3625 | | | |
| 2* | 2.3112 (r1) | 0.6767 (d1) | 1.5445 (Nd1) | 55.98 (vd1) | 6.62 (= f1) |
| 3* | 5.7779 (r2) | 0.2821 (t1) | | | |
| 4* | 3.4809 (r3) | 0.2720 (d2) | 1.6612 (Nd2) | 20.37 (vd2) | −14.46 (= f2) |
| 5* | 2.4726 (r4) | 0.2866 (t2) | | | |
| 6* | 5.1708 (r5) | 0.7032 (d3) | 1.5445 (Nd3) | 55.98 (vd3) | 6.15 (= f3) |
| 7* | −9.0345 (r6) | 0.4197 (t3) | | | |
| 8* | −1.4464 (r7) | 0.4000 (d4) | 1.6397 (Nd4) | 23.53 (vd4) | −8.00 (= f4) |
| 9* | −2.2335 (r8) | 0.0550 (t4) | | | |
| 10* | 1.9035 (r9) | 0.4700 (d5) | 1.5445 (Nd5) | 55.98 (vd5) | 9.01 (= f5) |
| 11* | 2.8398 (r10) | 0.2231 (t5) | | | |
| 12* | 7.0077 (r11) | 0.4600 (d6) | 1.5445 (Nd6) | 55.98 (vd6) | 126.06 (= f6) |
| 13* | 7.6239 (r12) | 0.4079 (t6) | | | |
| 14* | 2.4638 (r13) | 0.4850 (d7) | 1.5348 (Nd7) | 55.66 (vd7) | −11.02 (= f7) |
| 15* | 1.6183 (r14) | 0.2788 | | | |
| 16 | Infinity | 0.2100 | 1.5630 | 51.30 | |
| 17 | Infinity | 0.6462 | | | |
| (Image Plane) | Infinity | | | | |

| Lens group data | Composite Focal Length | | Entrance Pupil Diameter | |
|---|---|---|---|---|
| 1st lens-2nd lens | 10.14 | (= f12) | 2.810 | (= EPD) |
| 2nd lens- 3rd lens | 10.68 | (= f23) | | |
| 3rd lens- 4th lens | 24.47 | (= f34) | | |
| 6th lens-7th lens | −12.57 | (= f67) | | |
| 5th lens-6th lens-7th lens | 16.20 | (= f567) | | |

Aspheric Surface Data

| | Second Surface | Third Surface | Fourth Surface | Fifth Surface | Sixth Surface |
|---|---|---|---|---|---|
| k | 0.00000E+00 | 0.00000E+00 | 0.00000E+00 | 0.00000E+00 | 0.00000E+00 |
| A4 | −6.44925E−03 | −3.15088E−02 | −1.12990E−01 | −1.05741E−01 | −1.72562E−02 |
| A6 | 8.35016E−03 | 2.96526E−03 | 3.42630E−02 | 3.43900E−02 | 4.57500E−03 |
| A8 | −1.30742E−02 | −2.70734E−03 | 1.10201E−03 | 1.66736E−04 | −2.01691E−02 |
| A10 | 7.06688E−03 | −9.00808E−04 | −5.05284E−03 | −1.88722E−03 | 1.69965E−02 |
| A12 | −2.07377E−03 | 1.31549E−04 | 2.52716E−03 | 8.53673E−04 | −8.27479E−03 |
| A14 | 0.00000E+00 | 0.00000E+00 | −3.52338E−04 | 0.00000E+00 | 1.72912E−03 |
| A16 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 |

TABLE 1-continued

Unit mm
f = 4.79
Fno = 1.70
ω(°) = 39.5
ih = 4.03
TTL = 6.20

| | Seventh Surface | Eighth Surface | Ninth Surface | Tenth Surface | Eleventh Surface |
|---|---|---|---|---|---|
| k | 0.00000E+00 | −1.24388E+00 | 0.00000E+00 | −2.99575E+00 | 0.00000E+00 |
| A4 | −3.09171E−03 | 1.14207E−01 | 1.14402E−02 | −4.51921E−02 | 3.75115E−02 |
| A6 | −6.05278E−03 | −1.33794E−01 | −1.68913E−02 | 1.27425E−02 | −8.93125E−02 |
| A8 | 6.37976E−03 | 1.26001E−01 | 3.04889E−02 | −1.14498E−02 | 6.11237E−02 |
| A10 | −6.75940E−03 | −6.91414E−02 | −1.77244E−02 | 9.43589E−03 | −2.71937E−02 |
| A12 | 2.38736E−03 | 2.24296E−02 | 5.67614E−03 | −6.02375E−03 | 7.81777E−03 |
| A14 | −2.73936E−04 | −3.88648E−03 | −1.02436E−03 | 2.34135E−03 | −1.41309E−03 |
| A16 | 0.00000E+00 | 2.62107E−04 | 7.87612E−05 | −5.34600E−04 | 1.53366E−04 |
| A18 | 0.00000E+00 | 0.00000E+00 | 0.00000E+00 | 6.61723E−05 | −9.06759E−06 |
| A20 | 0.00000E+00 | 0.00000E+00 | 0.00000E+00 | −3.38613E−06 | 2.22988E−07 |

| | Twelfth Surface | Thirteenth Surface | Fourteenth Surface | Fifteenth Surface |
|---|---|---|---|---|
| k | −1.00000E+00 | −1.00000E+00 | −2.16357E+00 | −3.69547E+00 |
| A4 | 3.00581E−02 | 1.62215E−02 | −1.37743E−01 | −9.59832E−02 |
| A6 | −4.61935E−02 | −1.19626E−02 | 6.04107E−02 | 4.68604E−02 |
| A8 | 2.26465E−02 | −1.50505E−04 | −1.93712E−02 | −1.25660E−02 |
| A10 | −6.82023E−03 | 2.09493E−03 | 3.95729E−03 | 4.53945E−03 |
| A12 | 1.50806E−03 | −8.24287E−04 | −4.60426E−04 | −8.09218E−04 |
| A14 | −2.48159E−04 | 1.57775E−04 | 2.77135E−05 | 9.65196E−05 |
| A16 | 2.71379E−05 | −1.67370E−05 | −6.71679E−07 | −7.20997E−06 |
| A18 | −1.67605E−06 | 9.38069E−07 | −2.68612E−11 | 3.01152E−07 |
| A20 | 4.34054E−08 | −2.16239E−08 | 2.50000E−15 | −5.33533E−09 |

The imaging lens in Example 1 satisfies conditional expressions (1) to (18) as shown in Table 8.

Figure 2:
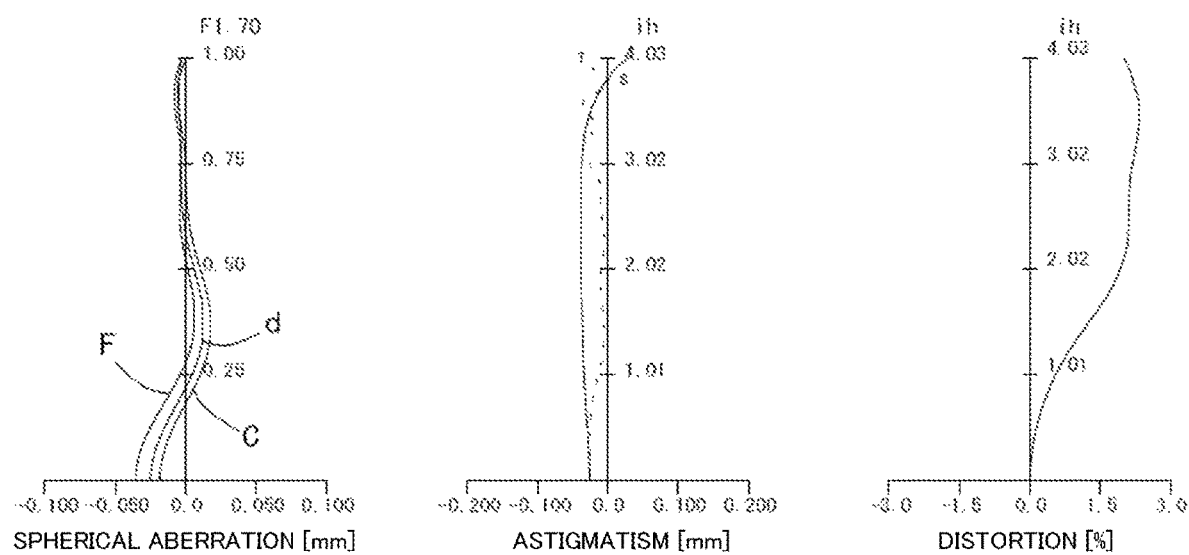
FIG. 2 shows spherical aberration, astigmatism, and distortion of the imaging lens in Example 1 according to the present invention.
Figure 3:
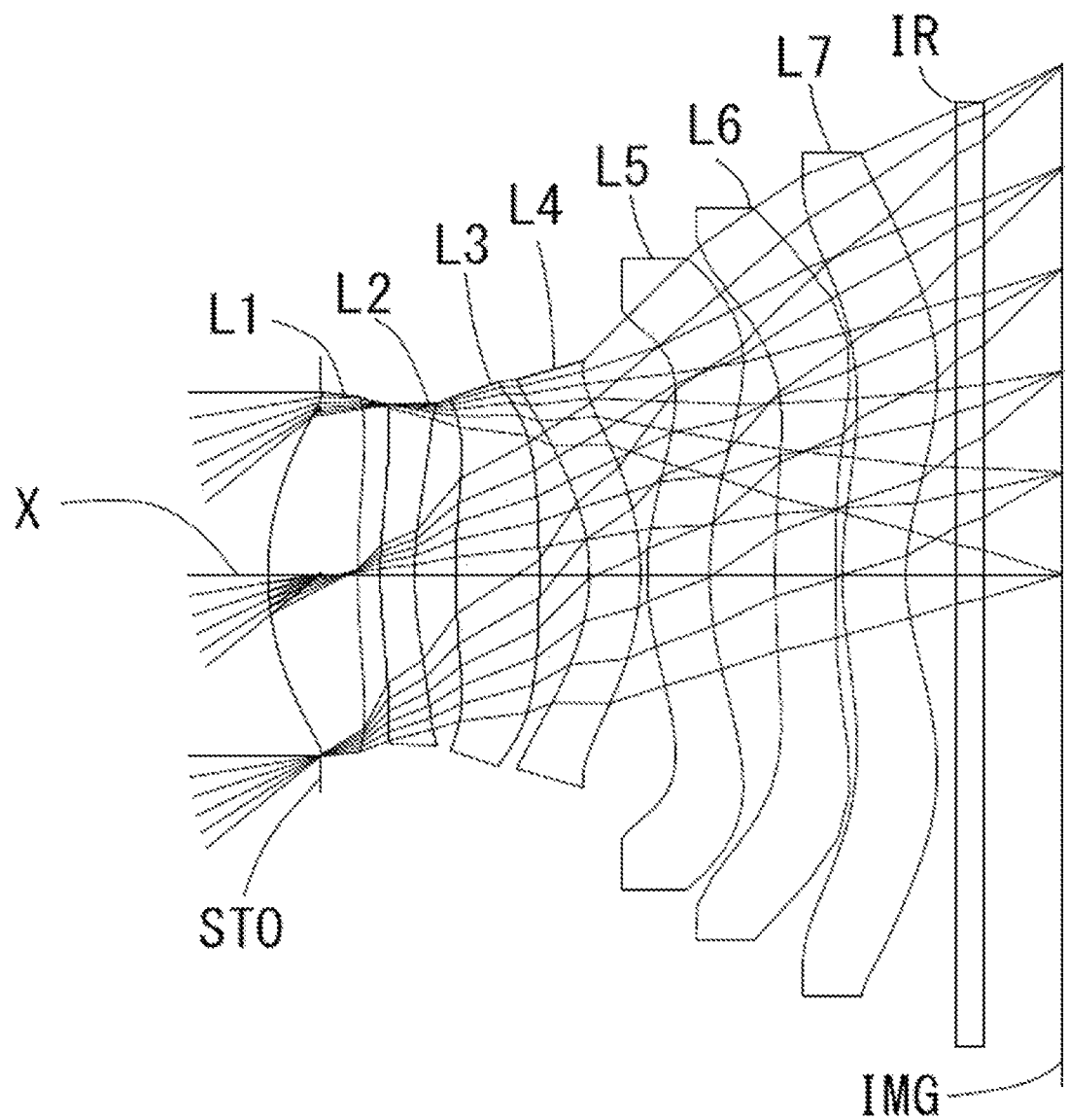
FIG. 3 is a schematic view showing the general configuration of an imaging lens in Example 2 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6, 8, 10, 12 and 14). As shown in FIG. 2, each aberration is corrected excellently.

Example 2

The basic lens data is shown below in Table 2.

TABLE 2

Unit mm
f = 4.88
Fno = 1.70
ω(°) = 39.1
ih = 4.03
TTL = 6.20

Surface Data

| Surface Number i | Curvature Radius r | Surface Distance d | Refractive Index Nd | Abbe Number vd | Focal Length |
|---|---|---|---|---|---|
| (Object) | Infinity | Infinity | | | |
| 1 (Stop) | Infinity | −0.4150 | | | |
| 2* | 2.3033 (r1) | 0.7070 (d1) | 1.5445 (Nd1) | 55.98 (vd1) | 6.86 (= f1) |
| 3* | 5.3516 (r2) | 0.1782 (t1) | | | |
| 4* | 3.3985 (r3) | 0.2721 (d2) | 1.6709 (Nd2) | 19.48 (vd2) | −24.87 (= f2) |
| 5* | 2.7326 (r4) | 0.3239 (t2) | | | |
| 6* | 5.8363 (r5) | 0.6605 (d3) | 1.5445 (Nd3) | 55.98 (vd3) | 7.16 (= f3) |
| 7* | −11.2520 (r6) | 0.3962 (t3) | | | |
| 8* | −1.5256 (r7) | 0.4000 (d4) | 1.6612 (Nd4) | 20.37 (vd4) | −8.93 (= f4) |
| 9* | −2.2715 (r8) | 0.0550 (t4) | | | |
| 10* | 1.9695 (r9) | 0.4933 (d5) | 1.5445 (Nd5) | 55.98 (vd5) | 11.75 (= f5) |
| 11* | 2.5938 (r10) | 0.5193 (t5) | | | |
| 12* | 10.3411 (r11) | 0.4800 (d6) | 1.5348 (Nd6) | 55.66 (vd6) | 11.82 (= f6) |
| 13* | −16.0000 (r12) | 0.0500 (t6) | | | |
| 14* | 3.4484 (r13) | 0.5009 (d7) | 1.5348 (Nd7) | 55.66 (vd7) | −6.14 (= f7) |
| 15* | 1.5973 (r14) | 0.2488 | | | |
| 16 | Infinity | 0.2100 | 1.5630 | 51.30 | |
| 17 | Infinity | 0.7766 | | | |
| (Image Plane) | Infinity | | | | |

TABLE 2-continued

Unit mm
f = 4.88
Fno = 1.70
ω(°) = 39.1
ih = 4.03
TTL = 6.20

| Lens group data | Composite Focal Length | | Entrance Pupil Diameter | |
| --- | --- | --- | --- | --- |
| 1st lens-2nd lens | 8.57 | (= f12) | 2.865 | (= EPD) |
| 2nd lens-3rd lens | 10.24 | (= f23) | | |
| 3rd lens-4th lens | 34.85 | (= f34) | | |
| 6th lens-7th lens | −15.24 | (= f67) | | |
| 5th lens-6th lens-7th lens | 24.11 | (= f567) | | |

Aspheric Surface Data

| | Second Surface | Third Surface | Fourth Surface | Fifth Surface | Sixth Surface |
| --- | --- | --- | --- | --- | --- |
| k | 0.00000E+00 | 0.00000E+00 | 0.00000E+00 | 1.99356E−01 | 0.00000E+00 |
| A4 | −5.51218E−03 | −4.43784E−02 | −1.10663E−01 | −9.75291E−02 | −1.78967E−02 |
| A6 | 9.33360E−03 | 1.23807E−03 | 2.00705E−03 | 7.19159E−03 | −2.04806E−02 |
| A8 | −1.39167E−02 | 1.26112E−02 | 4.54758E−02 | 1.64384E−02 | −1.00465E−03 |
| A10 | 8.20096E−03 | −1.49777E−02 | −3.63730E−02 | −4.93712E−03 | 4.16960E−03 |
| A12 | −2.50334E−03 | 6.12738E−03 | 1.41495E−02 | −1.88708E−03 | −6.60084E−03 |
| A14 | 7.96034E−05 | −9.63092E−04 | −2.06053E−03 | 1.22912E−03 | 2.54724E−03 |
| A16 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 |

| | Seventh Surface | Eighth Surface | Ninth Surface | Tenth Surface | Eleventh Surface |
| --- | --- | --- | --- | --- | --- |
| k | 0.00000E+00 | −9.66096E−01 | 0.00000E+00 | −3.55046E+00 | 0.00000E+00 |
| A4 | −3.65479E−03 | 1.00253E−01 | −1.22736E−02 | −1.01118E−01 | −5.55963E−02 |
| A6 | −3.43083E−02 | −1.42612E−01 | 9.61540E−03 | 1.04080E−01 | 2.02861E−02 |
| A8 | 2.91821E−02 | 1.38664E−01 | 5.23184E−03 | −1.02955E−01 | −1.53156E−02 |
| A10 | −2.57634E−02 | −7.33209E−02 | 1.79563E−04 | 7.42956E−02 | 6.75810E−03 |
| A12 | 1.02836E−02 | 2.12861E−02 | −2.49854E−04 | −3.89882E−02 | −1.90908E−03 |
| A14 | −1.37476E−03 | −2.86457E−03 | −3.18128E−04 | 1.39668E−02 | 3.48198E−04 |
| A16 | 0.00000E+00 | 8.22034E−05 | 9.66892E−05 | −3.17444E−03 | −4.15639E−05 |
| A18 | 0.00000E+00 | 0.00000E+00 | 0.00000E+00 | 4.04071E−04 | 3.10546E−06 |
| A20 | 0.00000E+00 | 0.00000E+00 | 0.00000E+00 | −2.15562E−05 | −1.13160E−07 |

| | Twelfth Surface | Thirteenth Surface | Fourteenth Surface | Fifteenth Surface |
| --- | --- | --- | --- | --- |
| k | 0.00000E+00 | 0.00000E+00 | 0.00000E+00 | −6.47731E+00 |
| A4 | 9.77159E−03 | 1.46787E−01 | −6.30931E−02 | −5.85692E−02 |
| A6 | −1.80178E−02 | −1.08337E−01 | 1.09607E−02 | 2.23407E−02 |
| A8 | 3.15284E−03 | 4.70621E−02 | −1.86861E−03 | −8.19644E−03 |
| A10 | −2.38894E−04 | −1.47020E−02 | 2.35922E−04 | 2.13178E−03 |
| A12 | 1.13969E−05 | 3.26214E−03 | −1.85905E−05 | −3.76188E−04 |
| A14 | −1.27420E−07 | −4.96823E−04 | 8.09661E−07 | 4.50090E−05 |
| A16 | 3.36806E−09 | 4.86769E−05 | −1.22753E−08 | −3.48251E−06 |
| A18 | −1.54370E−11 | −2.72204E−06 | 1.76872E−10 | 1.55030E−07 |
| A20 | −2.63746E−10 | 6.53524E−08 | −4.00302E−11 | −2.97539E−09 |

The imaging lens in Example 2 satisfies conditional expressions (1) to (18) as shown in Table 8.

Figure 4:
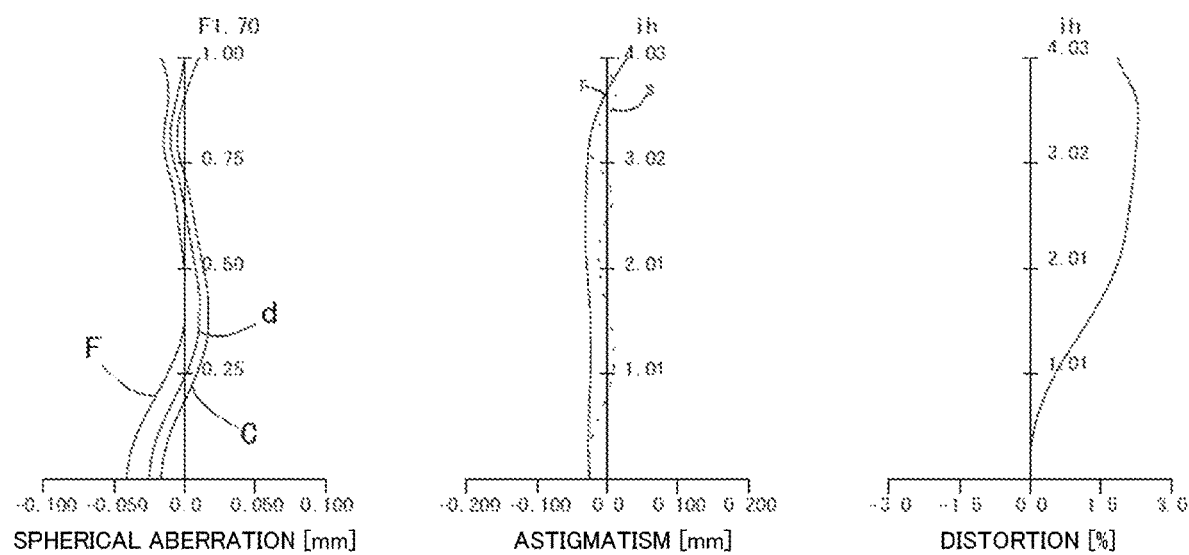
FIG. 4 shows spherical aberration, astigmatism, and distortion of the imaging lens in Example 2 according to the present invention.
Figure 5:
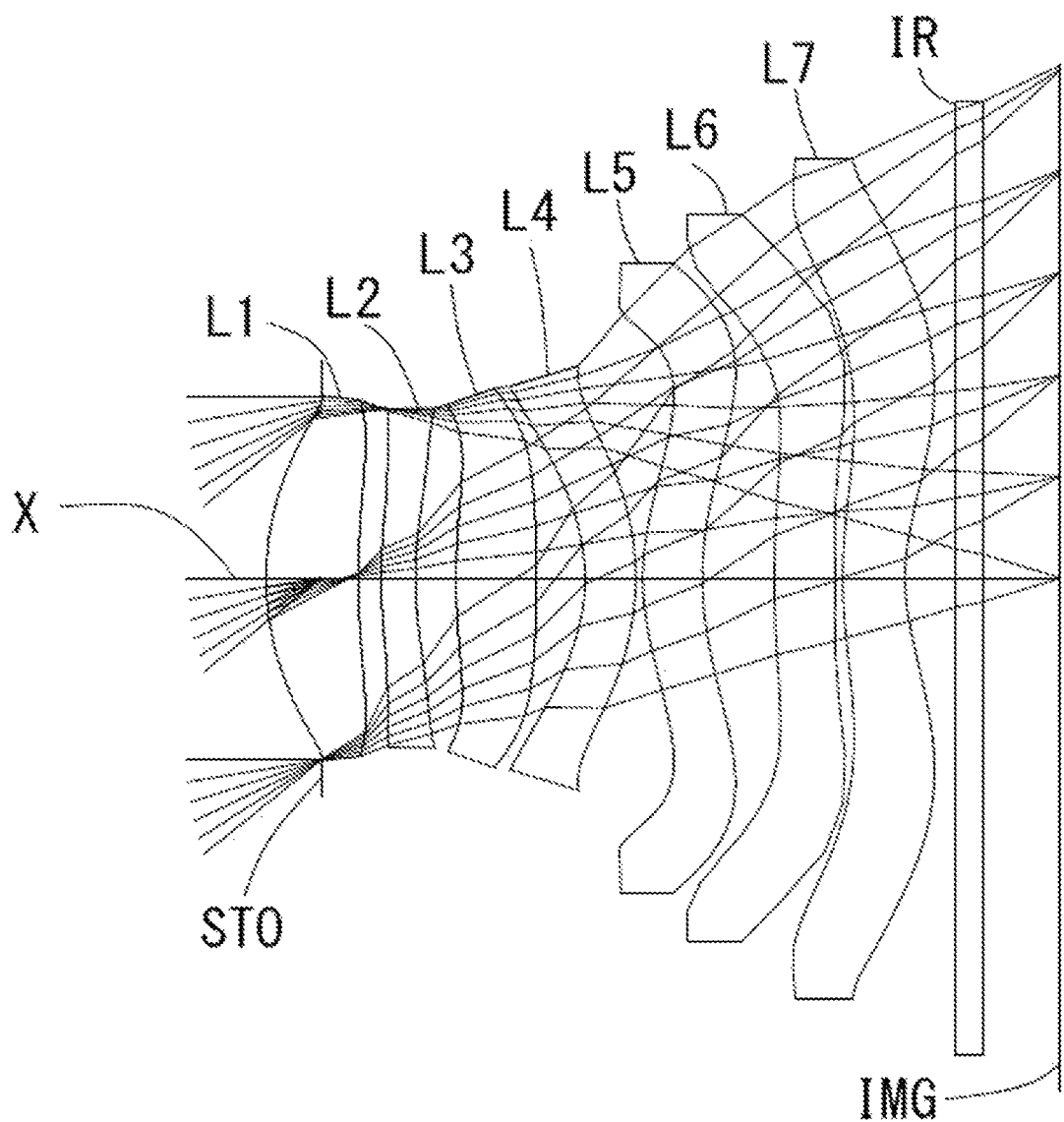
FIG. 5 is a schematic view showing the general configuration of an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Unit mm
f = 4.90
Fno = 1.70
ω(°) = 38.9
ih = 4.03
TTL = 6.20

Surface Data

| Surface Number i | Curvature Radius r | Surface Distance d | Refractive Index Nd | Abbe Number νd | Focal Length |
|---|---|---|---|---|---|
| (Object) | Infinity | Infinity | | | |
| 1 (Stop) | Infinity | −0.4350 | | | |
| 2* | 2.2617 (r1) | 0.7274 (d1) | 1.5445 (Nd1) | 55.98 (νd1) | 6.62 (= f1) |
| 3* | 5.3795 (r2) | 0.1796 (t1) | | | |
| 4* | 3.6532 (r3) | 0.2720 (d2) | 1.6709 (Nd2) | 19.48 (νd2) | −22.85 (= f2) |
| 5* | 2.8619 (r4) | 0.3243 (t2) | | | |
| 6* | 5.6975 (r5) | 0.6303 (d3) | 1.5445 (Nd3) | 55.98 (νd3) | 7.35 (= f3) |
| 7* | −12.9039 (r6) | 0.3866 (t3) | | | |
| 8* | −1.4840 (r7) | 0.4000 (d4) | 1.6612 (Nd4) | 20.37 (νd4) | −8.62 (= f4) |
| 9* | −2.2216 (r8) | 0.0559 (t4) | | | |
| 10* | 1.9158 (r9) | 0.4706 (d5) | 1.5445 (Nd5) | 55.98 (νd5) | 11.19 (= f5) |
| 11* | 2.5525 (r10) | 0.5688 (t5) | | | |
| 12* | 9.1813 (r11) | 0.4800 (d6) | 1.5348 (Nd6) | 55.66 (νd6) | 11.32 (= f6) |
| 13* | −17.4581 (r12) | 0.0599 (t6) | | | |
| 14* | 3.8367 (r13) | 0.4926 (d7) | 1.5348 (Nd7) | 55.66 (νd7) | −6.06 (= f7) |
| 15* | 1.6781 (r14) | 0.2371 | | | |
| 16 | Infinity | 0.2100 | 1.5630 | 51.30 | |
| 17 (Image Plane) | Infinity | 0.7757 | | | |

| Lens group data | Composite Focal Length | | Entrance Pupil Diameter | |
|---|---|---|---|---|
| 1st lens-2nd lens | 8.39 | (= f12) | 2.880 | (= EPD) |
| 2nd lens-3rd lens | 10.99 | (= f23) | | |
| 3rd lens-4th lens | 47.62 | (= f34) | | |
| 6th lens-7th lens | −15.67 | (= f67) | | |
| 5th lens-6th lens-7th lens | 20.83 | (= f567) | | |

Aspheric Surface Data

| | Second Surface | Third Surface | Fourth Surface | Fifth Surface | Sixth Surface |
|---|---|---|---|---|---|
| k | 0.00000E+00 | 0.00000E+00 | 0.00000E+00 | 1.64513E−01 | 0.00000E+00 |
| A4 | −4.50982E−03 | −4.24610E−02 | −1.09811E−01 | −9.87668E−02 | −2.21303E−02 |
| A6 | 8.96388E−03 | 1.05408E−02 | 2.51846E−03 | 7.73981E−03 | −2.08537E−02 |
| A8 | −1.35393E−02 | 1.20439E−02 | 4.53984E−02 | 1.67578E−02 | −2.07184E−03 |
| A10 | 8.27768E−03 | −1.50096E−02 | −3.64719E−02 | −5.19413E−03 | 4.01165E−03 |
| A12 | −2.58367E−03 | 6.24365E−03 | 1.41098E−02 | −1.78655E−03 | −6.89583E−03 |
| A14 | 8.30965E−05 | −9.69320E−04 | −1.97978E−03 | 1.17603E−03 | 2.64817E−03 |
| A16 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 |

| | Seventh Surface | Eighth Surface | Ninth Surface | Tenth Surface | Eleventh Surface |
|---|---|---|---|---|---|
| k | 0.00000E+00 | −9.43592E−01 | 0.00000E+00 | −3.26097E+00 | 0.00000E+00 |
| A4 | −6.22316E−03 | 9.10504E−02 | −1.62359E−02 | −9.40186E−02 | −4.53718E−02 |
| A6 | −3.54172E−02 | −1.26755E−01 | 1.86572E−02 | 9.18402E−02 | 3.36853E−03 |
| A8 | 2.90110E−02 | 1.12307E−01 | −9.76528E−03 | −9.12871E−02 | −4.98738E−03 |
| A10 | −2.59564E−02 | −4.35073E−02 | 1.52277E−02 | 6.46391E−02 | 3.36269E−03 |
| A12 | 1.02339E−02 | 3.27665E−03 | −7.78604E−03 | −3.21445E−02 | −1.35374E−03 |
| A14 | −1.29921E−03 | 2.52489E−03 | 1.50510E−03 | 1.07100E−02 | 3.30495E−04 |
| A16 | 0.00000E+00 | −5.51209E−04 | −7.32454E−05 | −2.26157E−03 | −5.05055E−05 |
| A18 | 0.00000E+00 | 0.00000E+00 | 0.00000E+00 | 2.69515E−04 | 4.58604E−06 |
| A20 | 0.00000E+00 | 0.00000E+00 | 0.00000E+00 | −1.35719E−05 | −1.90887E−07 |

TABLE 3-continued

Unit mm
f = 4.90
Fno = 1.70
ω(°) = 38.9
ih = 4.03
TTL = 6.20

|  | Twelfth Surface | Thirteenth Surface | Fourteenth Surface | Fifteenth Surface |
|---|---|---|---|---|
| k | 0.00000E+00 | 0.00000E+00 | 0.00000E+00 | −6.64629E+00 |
| A4 | 6.29581E−03 | 1.27788E−01 | −6.20042E−02 | −5.84041E−02 |
| A6 | −1.82959E−02 | −9.20581E−02 | 1.09993E−02 | 2.26057E−02 |
| A8 | 3.15951E−03 | 3.79155E−02 | −1.86557E−03 | −9.18094E−03 |
| A10 | −2.34942E−04 | −1.13854E−02 | 2.36367E−04 | 2.77137E−03 |
| A12 | 1.17911E−05 | 2.45544E−03 | −1.85460E−05 | −5.70063E−04 |
| A14 | −1.05134E−07 | −3.64082E−04 | 8.12435E−07 | 7.70484E−05 |
| A16 | 1.01375E−08 | 3.46286E−05 | −1.20139E−08 | −6.46076E−06 |
| A18 | 2.95151E−10 | −1.87660E−06 | 1.97982E−10 | 3.01701E−07 |
| A20 | −4.12116E−10 | 4.37855E−08 | −4.06314E−11 | −5.95676E−09 |

The imaging lens in Example 3 satisfies conditional expressions (1) to (18) as shown in Table 8.

Figure 6:
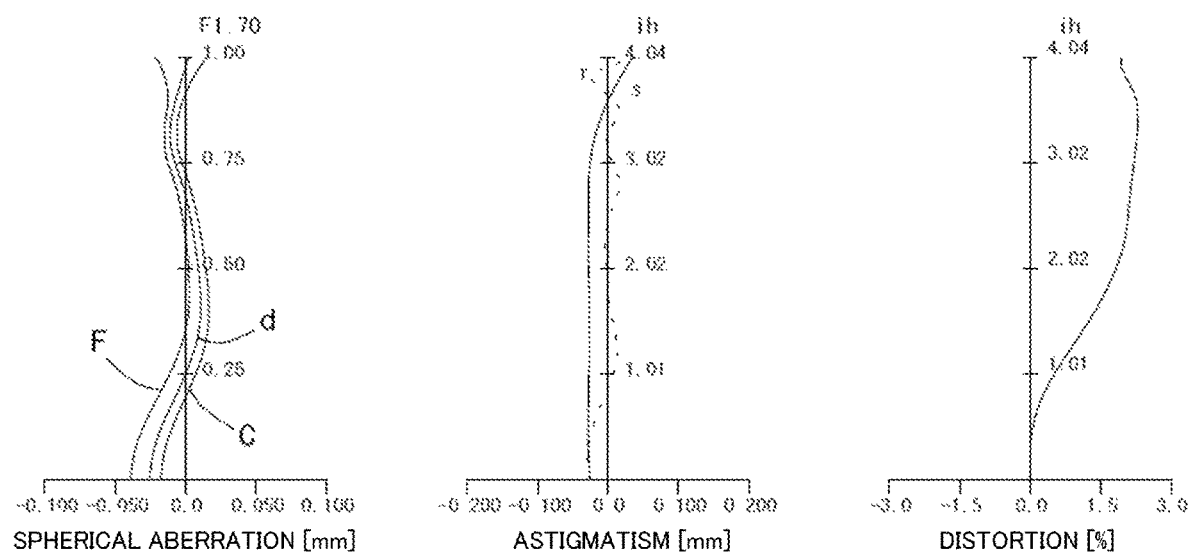
FIG. 6 shows spherical aberration, astigmatism, and distortion of the imaging lens in Example 3 according to the present invention.
Figure 7:
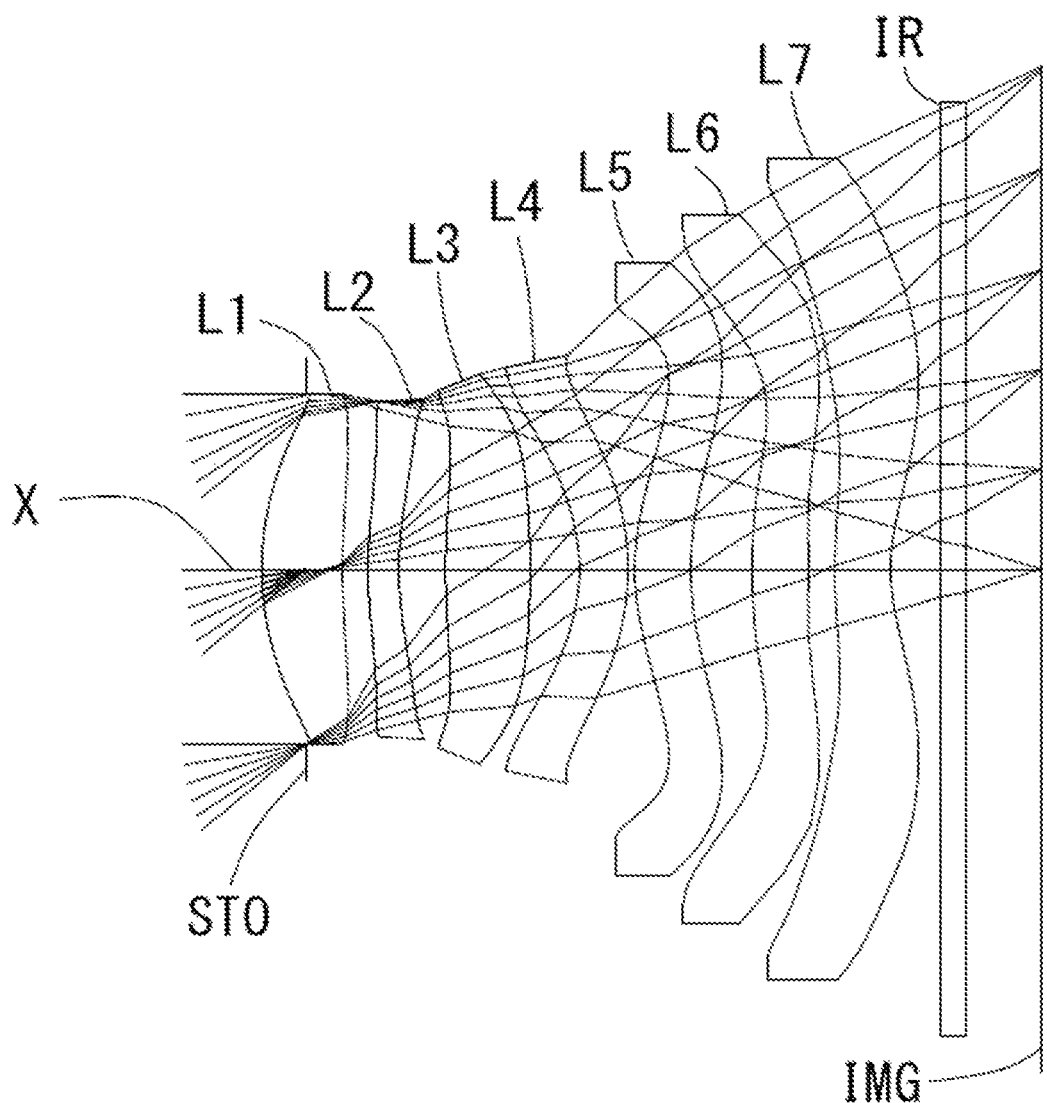
FIG. 7 is a schematic view showing the general configuration of an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Unit mm
f = 4.81
Fno = 1.70
ω(°) = 39.4
ih = 4.03
TTL = 6.20

Surface Data

| Surface Number i | Curvature Radius r | Surface Distance d | Refractive Index Nd | Abbe Number vd | Focal Length |
|---|---|---|---|---|---|
| (Object) | Infinity | Infinity |  |  |  |
| 1 (Stop) | Infinity | −0.3550 (d1) |  |  |  |
| 2* | 2.4118 (r1) | 0.6486 (t1) | 1.5445 (Nd1) | 55.98 (vd1) | 6.86 (= f1) |
| 3* | 6.1650 (r2) | 0.2042 (d2) |  |  |  |
| 4* | 3.3506 (r3) | 0.2500 (t2) | 1.6612 (Nd2) | 20.37 (vd2) | −21.65 (= f2) |
| 5* | 2.6345 (r4) | 0.3751 (d3) |  |  |  |
| 6* | 6.1259 (r5) | 0.6772 (t3) | 1.5445 (Nd3) | 55.98 (vd3) | 7.15 (= f3) |
| 7* | −10.2539 (r6) | 0.4003 (d4) |  |  |  |
| 8* | −1.4727 (r7) | 0.3893 (t4) | 1.6709 (Nd4) | 19.48 (vd4) | −8.93 (= f4) |
| 9* | −2.1604 (r8) | 0.0550 (d5) |  |  |  |
| 10* | 1.9259 (r9) | 0.4509 (t5) | 1.5445 (Nd5) | 55.98 (vd5) | 11.34 (= f5) |
| 11* | 2.5681 (r10) | 0.4945 (d6) |  |  |  |
| 12* | 5.9513 (r11) | 0.4500 (t6) | 1.5348 (Nd6) | 55.66 (vd6) | 8.30 (= f6) |
| 13* | −17.0389 (r12) | 0.2130 (d7) |  |  |  |
| 14* | 4.2200 (r13) | 0.4490 |  | 1.5348 (Nd7) | 55.66 (vd7) | −4.92 (= f7) |
| 15* | 1.5606 (r14) | 0.2262 |  |  |  |
| 16 | Infinity | 0.2100 | 1.5630 | 51.30 |  |
| 17 | Infinity | 0.7791 |  |  |  |
| (Image Plane) | Infinity |  |  |  |  |

| Lens group data | Composite Focal Length | | Entrance Pupil Diameter | |
|---|---|---|---|---|
| 1st lens-2nd lens | 9.02 | (= f12) | 2.820 | (= EPD) |
| 2nd lens-3rd lens | 10.74 | (= f23) |  |  |
| 3rd lens-4th lens | 35.21 | (= f34) |  |  |
| 6th lens-7th lens | −16.62 | (= f67) |  |  |
| 5th lens-6th lens-7th lens | 19.01 | (= f567) |  |  |

TABLE 4-continued

Unit mm
f = 4.81
Fno = 1.70
ω(°) = 39.4
ih = 4.03
TTL = 6.20

Aspheric Surface Data

|     | Second Surface | Third Surface | Fourth Surface | Fifth Surface | Sixth Surface |
| --- | --- | --- | --- | --- | --- |
| k   | 0.00000E+00 | 0.00000E+00 | 0.00000E+00 | 0.00000E+00 | 0.00000E+00 |
| A4  | −5.12156E−03 | −3.91898E−02 | −1.17539E−01 | −1.06661E−01 | −2.41304E−02 |
| A6  | 8.14997E−03 | 1.78414E−03 | 1.09658E−02 | 1.01744E−02 | −1.92635E−02 |
| A8  | −1.35640E−02 | 1.19800E−02 | 4.78132E−02 | 3.53407E−02 | 4.67371E−03 |
| A10 | 8.23110E−03 | −1.50224E−02 | −4.60228E−02 | −3.20716E−02 | −4.74448E−03 |
| A12 | −2.61986E−03 | 6.26251E−03 | 2.02954E−02 | 1.32382E−02 | −6.87516E−04 |
| A14 | 9.68060E−05 | −1.02142E−03 | −3.33101E−03 | −1.71338E−03 | 1.20427E−03 |
| A16 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 |

|     | Seventh Surface | Eighth Surface | Ninth Surface | Tenth Surface | Eleventh Surface |
| --- | --- | --- | --- | --- | --- |
| k   | 0.00000E+00 | −1.00617E+00 | 0.00000E+00 | −2.92961E+00 | 0.00000E+00 |
| A4  | −1.92927E−02 | 8.95765E−02 | 6.81643E−03 | −7.29819E−02 | −2.37989E−02 |
| A6  | −1.56585E−02 | −9.74797E−02 | 1.12799E−03 | 6.12415E−02 | −3.92616E−02 |
| A8  | −3.50175E−03 | 4.38010E−02 | −1.05741E−02 | −7.32214E−02 | 2.82706E−02 |
| A10 | 2.75016E−03 | 2.10198E−02 | 2.31412E−02 | 6.44717E−02 | −1.07254E−02 |
| A12 | −4.53028E−04 | −2.62247E−02 | −1.27758E−02 | −3.70182E−02 | 2.34535E−03 |
| A14 | 9.90835E−05 | 8.95638E−03 | 2.82240E−03 | 1.33201E−02 | −3.28090E−04 |
| A16 | 0.00000E+00 | −1.05039E−03 | −2.02537E−04 | −2.91132E−03 | 3.45760E−05 |
| A18 | 0.00000E+00 | 0.00000E+00 | 0.00000E+00 | 3.50510E−04 | −2.89978E−06 |
| A20 | 0.00000E+00 | 0.00000E+00 | 0.00000E+00 | −1.76301E−05 | 1.27800E−07 |

|     | Twelfth Surface | Thirteenth Surface | Fourteenth Surface | Fifteenth Surface |
| --- | --- | --- | --- | --- |
| k   | 0.00000E+00 | 0.00000E+00 | 0.00000E+00 | −5.76454E+00 |
| A4  | 6.94900E−02 | 1.73757E−01 | −1.02228E−01 | −8.22692E−02 |
| A6  | −7.85992E−02 | −1.36784E−01 | 1.87516E−02 | 3.13008E−02 |
| A8  | 2.59756E−02 | 5.29535E−02 | 1.25493E−03 | −9.31168E−03 |
| A10 | −5.54638E−03 | −1.23795E−02 | 1.08148E−04 | 2.28338E−03 |
| A12 | 9.15024E−04 | 1.86262E−03 | −5.40722E−04 | −4.44826E−04 |
| A14 | −9.54053E−05 | −1.91332E−04 | 1.63223E−04 | 6.01902E−05 |
| A16 | 2.51485E−06 | 1.38935E−05 | −2.13107E−05 | −5.00878E−06 |
| A18 | 4.60490E−07 | −6.67046E−07 | 1.33221E−06 | 2.26180E−07 |
| A20 | −3.16068E−08 | 1.56197E−08 | −3.26525E−08 | −4.21474E−09 |

The imaging lens in Example 4 satisfies conditional expressions (1) to (18) as shown in Table 8.

Figure 8:
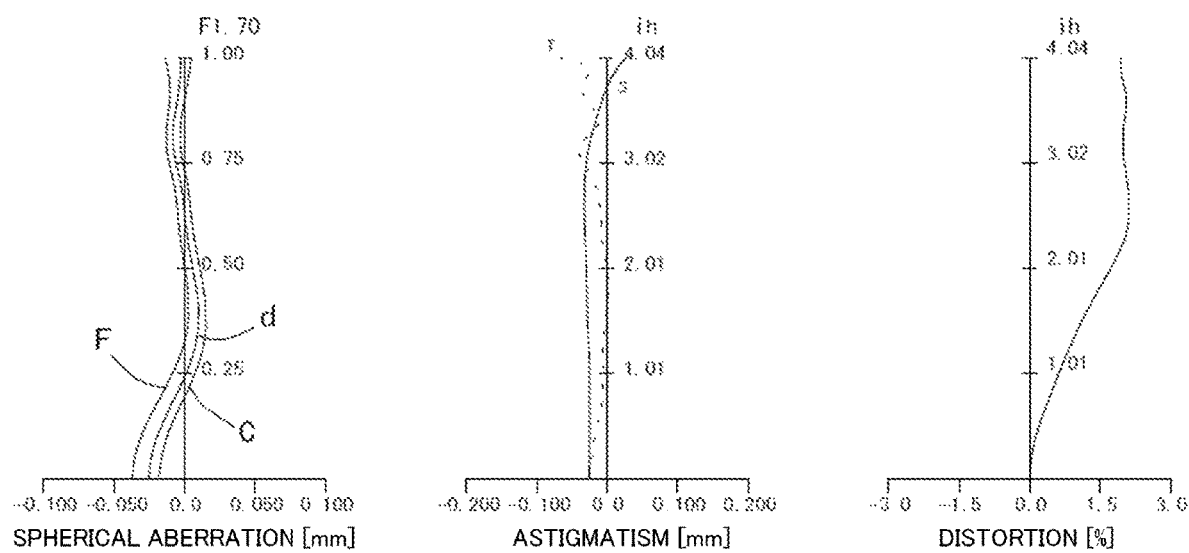
FIG. 8 shows spherical aberration, astigmatism, and distortion of the imaging lens in Example 4 according to the present invention.
Figure 9:
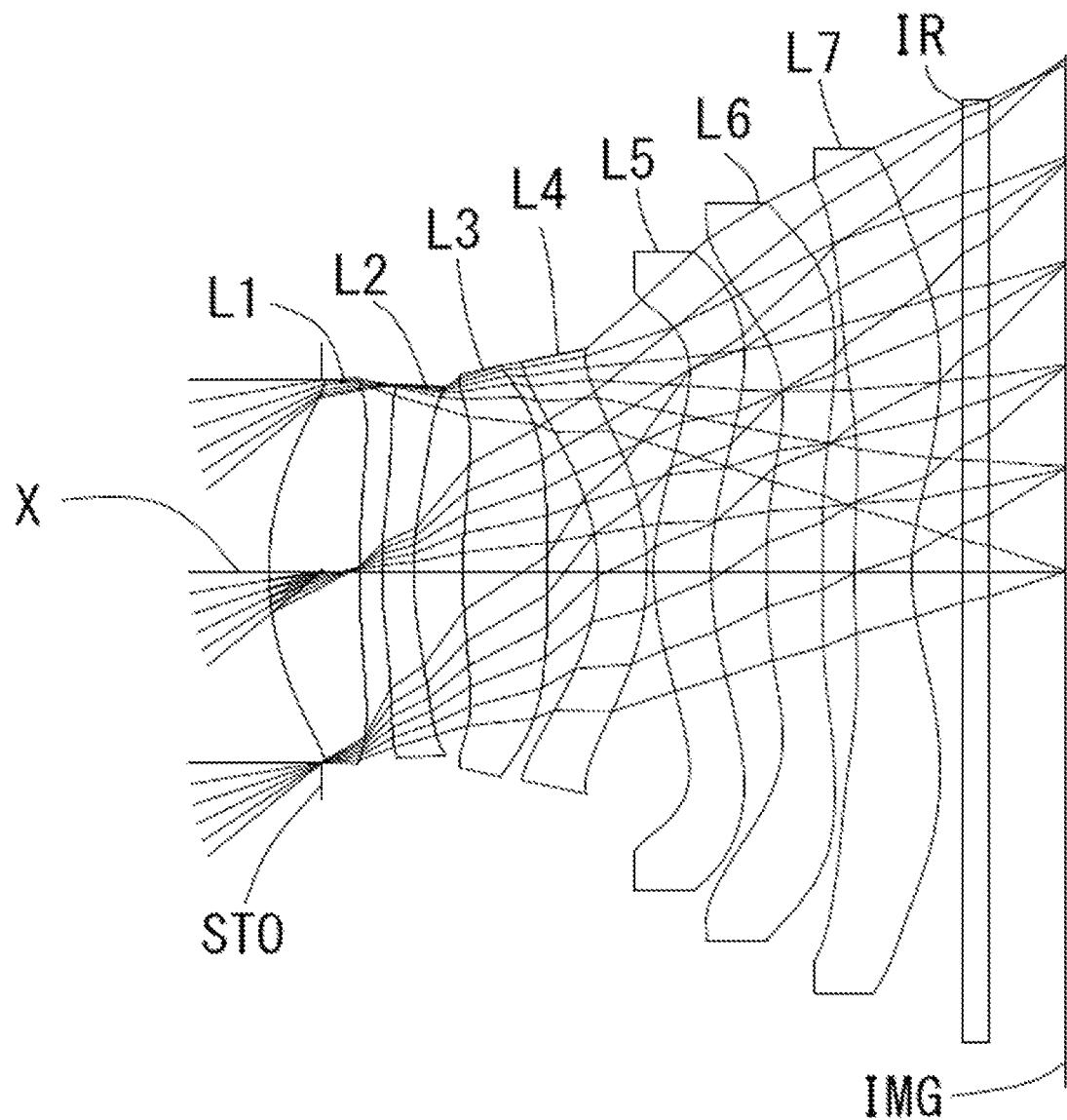
FIG. 9 is a schematic view showing a general configuration of an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Unit mm
f = 4.80
Fno = 1.60
ω(°) = 39.5
ih = 4.03
TTL = 6.20

Surface Data

| Surface Number i | Curvature Radius r | | Surface Distance d | | Refractive Index Nd | | Abbe Number νd | | Focal Length | |
| --- | --- | --- | --- | --- | --- | --- | --- | --- | --- | --- |
| (Object) | Infinity | | Infinity | | | | | | | |
| 1 (Stop) | Infinity | | −0.4200 | | | | | | | |
| 2* | 2.4027 | (r1) | 0.7104 | (d1) | 1.5445 | (Nd1) | 55.98 | (vd1) | 6.96 | (= f1) |
| 3* | 5.8877 | (r2) | 0.1777 | (t1) | | | | | | |
| 4* | 3.2654 | (r3) | 0.2500 | (d2) | 1.6612 | (Nd2) | 20.37 | (vd2) | −22.87 | (= f2) |

TABLE 5-continued

Unit mm
f = 4.80
Fno = 1.60
ω(°) = 39.5
ih = 4.03
TTL = 6.20

| | | | | | | | | | |
|---|---|---|---|---|---|---|---|---|---|
| 5* | 2.8036 (r4) | 0.3892 (t2) | | | | | | | |
| 6* | 5.2911 (r5) | 0.6623 (d3) | 1.5445 (Nd3) | 55.98 (vd3) | 7.50 (= f3) |
| 7* | −17.0715 (r6) | 0.3967 (t3) | | | | | | | |
| 8* | −1.5442 (r7) | 0.3877 (d4) | 1.6709 (Nd4) | 19.48 (vd4) | −9.41 (= f4) |
| 9* | −2.2503 (r8) | 0.0550 (t4) | | | | | | | |
| 10* | 2.0172 (r9) | 0.4508 (d5) | 1.5445 (Nd5) | 55.98 (vd5) | 12.48 (= f5) |
| 11* | 2.6426 (r10) | 0.4346 (t5) | | | | | | | |
| 12* | 5.5114 (r11) | 0.4506 (d6) | 1.5348 (Nd6) | 55.66 (vd6) | 6.71 (= f6) |
| 13* | −10.0000 (r12) | 0.2412 (t6) | | | | | | | |
| 14* | 6.2924 (r13) | 0.4516 (d7) | 1.5348 (Nd7) | 55.66 (vd7) | −4.52 (= f7) |
| 15* | 1.7017 (r14) | 0.2272 | | | | | | | |
| 16 | Infinity | 0.2100 | 1.5630 | 51.30 | | | | | |
| 17 | Infinity | 0.7766 | | | | | | | |
| (Image Plane) | Infinity | | | | | | | | |

| Lens group data | Composite Focal Length | | Entrance Pupil Diameter | |
|---|---|---|---|---|
| 1st lens-2nd lens | 8.99 | (= f12) | 2.995 | (= EPD) |
| 2nd lens-3rd lens | 11.30 | (= f23) | | |
| 3rd lens-4th lens | 35.44 | (= f34) | | |
| 6th lens-7th lens | −22.53 | (= f67) | | |
| 5th lens-6th lens-7th lens | 17.79 | (= f567) | | |

Aspheric Surface Data

| | Second Surface | Third Surface | Fourth Surface | Fifth Surface | Sixth Surface |
|---|---|---|---|---|---|
| k | 0.00000E+00 | 0.00000E+00 | 0.00000E+00 | 0.00000E+00 | 0.00000E+00 |
| A4 | −4.47779E−03 | −3.52115E−02 | −1.07425E−01 | −9.87908E−02 | −2.29150E−02 |
| A6 | 7.62599E−03 | 1.30631E−03 | 8.95933E−03 | 9.04076E−03 | −1.66584E−02 |
| A8 | −1.10136E−02 | 9.11361E−03 | 3.86217E−02 | 2.88768E−02 | 4.00317E−03 |
| A10 | 6.19686E−03 | −1.16121E−02 | −3.53514E−02 | −2.45315E−02 | −3.60859E−03 |
| A12 | −1.91101E−03 | 4.57645E−03 | 1.45996E−02 | 9.53472E−03 | −5.60718E−04 |
| A14 | 8.02824E−05 | −6.67663E−04 | −2.19206E−03 | −1.17908E−03 | 8.04740E−04 |
| A16 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 |

| | Seventh Surface | Eighth Surface | Ninth Surface | Tenth Surface | Eleventh Surface |
|---|---|---|---|---|---|
| k | 0.00000E+00 | −1.00824E+00 | 0.00000E+00 | −3.06003E+00 | 0.00000E+00 |
| A4 | −1.68277E−02 | 7.47843E−02 | 4.36907E−03 | −6.25750E−02 | −2.50164E−02 |
| A6 | −1.37744E−02 | −7.58035E−02 | 2.94338E−04 | 4.99842E−02 | −2.70916E−02 |
| A8 | −3.15625E−03 | 2.70454E−02 | −9.08948E−03 | −5.56343E−02 | 1.65323E−02 |
| A10 | 2.11154E−03 | 2.52522E−02 | 2.09049E−02 | 4.50721E−02 | −4.66243E−03 |
| A12 | −3.04856E−03 | −2.43289E−02 | −1.13854E−02 | −2.39163E−02 | 3.97689E−04 |
| A14 | 6.88405E−05 | 7.61017E−03 | 2.49410E−03 | 7.95143E−03 | 9.76742E−05 |
| A16 | 0.00000E+00 | −8.41656E−04 | −1.84534E−04 | −1.60464E−03 | −2.85724E−05 |
| A18 | 0.00000E+00 | 0.00000E+00 | 0.00000E+00 | 1.78472E−04 | 2.76114E−06 |
| A20 | 0.00000E+00 | 0.00000E+00 | 0.00000E+00 | −8.30090E−06 | −9.69973E−08 |

| | Twelfth Surface | Thirteenth Surface | Fourteenth Surface | Fifteenth Surface |
|---|---|---|---|---|
| k | 0.00000E+00 | 0.00000E+00 | 0.00000E+00 | −6.83221E+00 |
| A4 | 5.81143E−02 | 1.66942E−01 | −7.73074E−02 | −6.35514E−02 |
| A6 | −6.40921E−02 | −1.20423E−01 | 1.45995E−02 | 2.24500E−02 |
| A8 | 1.97058E−02 | 4.57261E−02 | 8.53031E−04 | −6.04860E−03 |
| A10 | −3.87917E−03 | −1.08615E−02 | 6.66940E−05 | 1.19326E−03 |
| A12 | 5.91158E−04 | 1.75514E−03 | −3.13163E−04 | −1.83729E−04 |
| A14 | −5.69550E−05 | −2.06695E−04 | 8.55994E−05 | 2.15098E−05 |
| A16 | 1.38356E−06 | 1.76079E−05 | −1.01178E−05 | −1.66888E−06 |
| A18 | 2.34378E−07 | −9.50831E−07 | 5.72883E−07 | 7.22346E−08 |
| A20 | −1.48578E−08 | 2.34729E−08 | −1.27217E−08 | −1.29091E−09 |

The imaging lens in Example 5 satisfies conditional expressions (1) to (18) as shown in Table 8.

Figure 10:
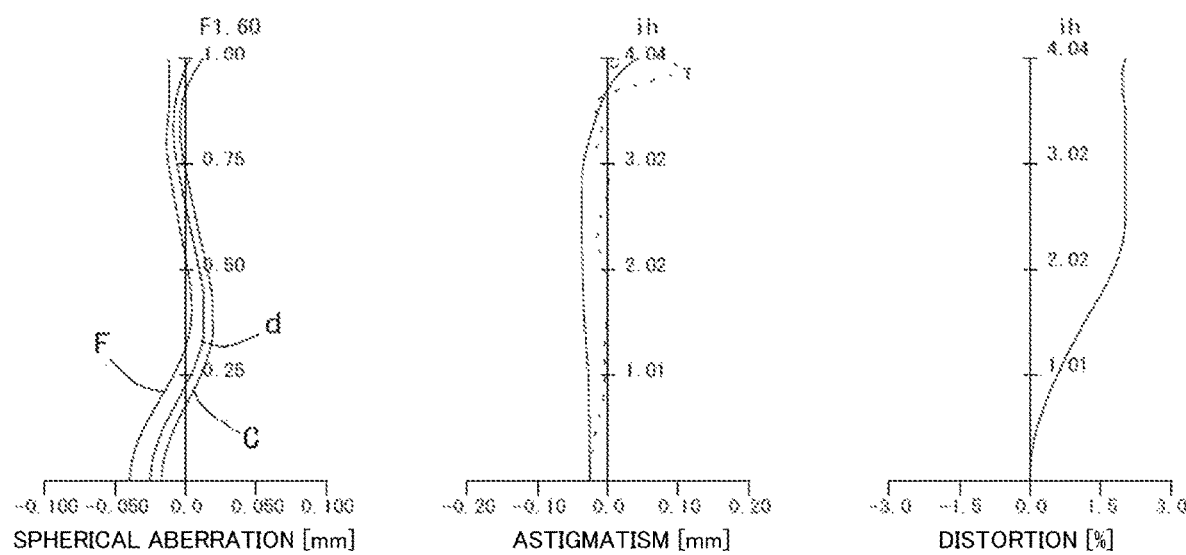
FIG. 10 shows spherical aberration, astigmatism, and distortion of the imaging lens in Example 5 according to the present invention.
Figure 11:
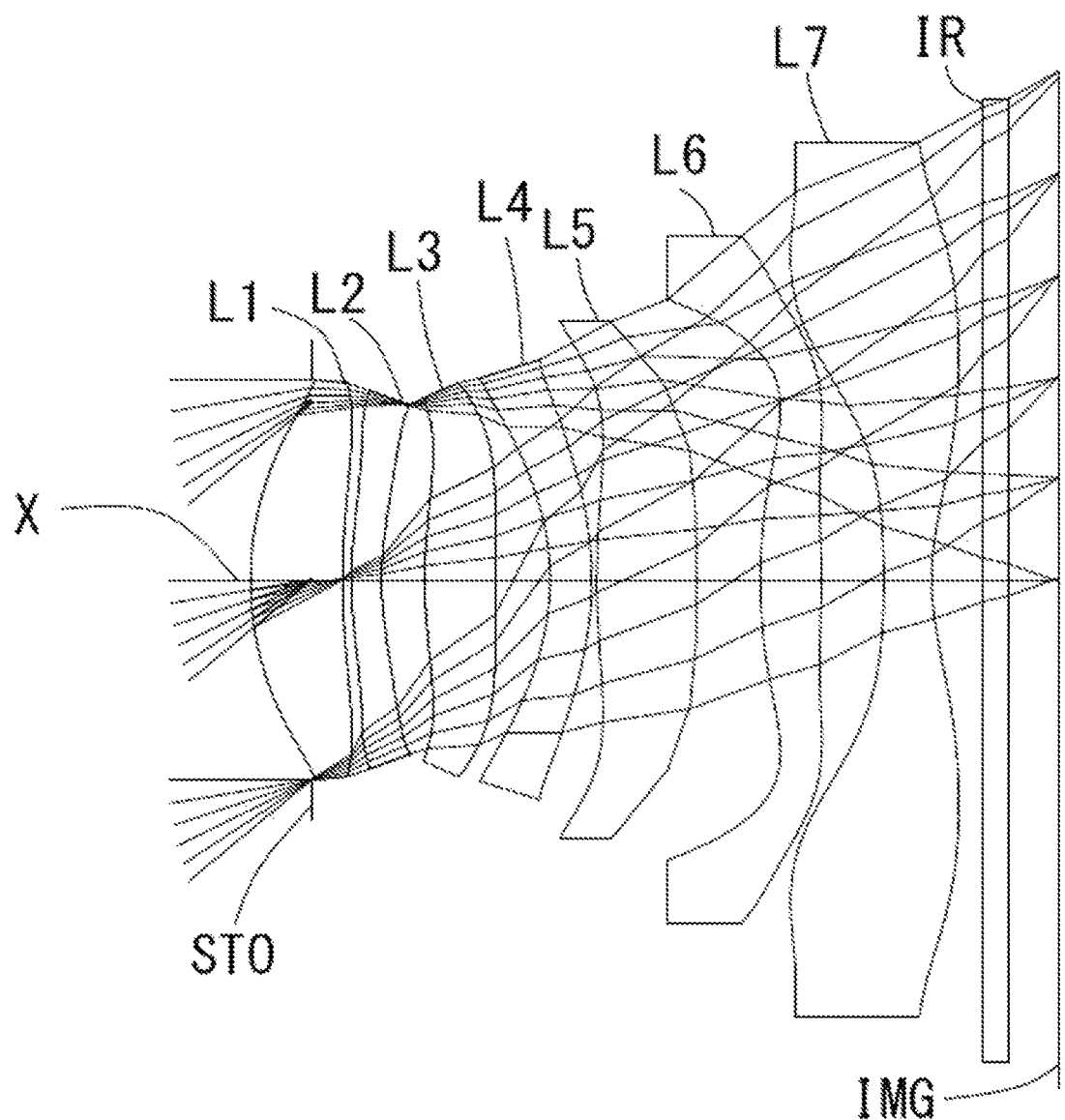
FIG. 11 is a schematic view showing the general configuration of an imaging lens in Example 6 according to the present invention.

FIG. 10 shows spherical aberration (mm), astigmatism (mm), and distortion (%) of the imaging lens in Example 5. As shown in FIG. 10, each aberration is corrected excellently.

Example 6

The basic lens data is shown below in Table 6.

TABLE 6

Unit mm
f = 4.76
Fno = 1.51
ω(°) = 39.7
ih = 4.03
TTL = 6.33

Surface Data

| Surface Number i | Curvature Radius r | Surface Distance d | Refractive Index Nd | Abbe Number vd | Focal Length |
|---|---|---|---|---|---|
| (Object) | Infinity | Infinity | | | |
| 1 (Stop) | Infinity | −0.4800 | | | |
| 2* | 2.5106 (r1) | 0.7282 (d1) | 1.5445 (Nd1) | 55.98 (vd1) | 8.35 (= f1) |
| 3* | 5.0334 (r2) | 0.0725 (t1) | | | |
| 4* | 3.2143 (r3) | 0.2400 (d2) | 1.6612 (Nd2) | 20.37 (vd2) | −29.72 (= f2) |
| 5* | 2.6803 (r4) | 0.3412 (t2) | | | |
| 6* | 4.1440 (r5) | 0.5579 (d3) | 1.5445 (Nd3) | 55.98 (vd3) | 8.56 (= f3) |
| 7* | 35.6203 (r6) | 0.4372 (t3) | | | |
| 8* | −1.8938 (r7) | 0.3300 (d4) | 1.6709 (Nd4) | 19.48 (vd4) | −12.94 (= f4) |
| 9* | −2.5916 (r8) | 0.0400 (t4) | | | |
| 10* | 6.0411 (r9) | 0.7893 (d5) | 1.5445 (Nd5) | 55.98 (vd5) | 10.42 (= f5) |
| 11* | −88.5588 (r10) | 0.5085 (t5) | | | |
| 12* | 5.2246 (r11) | 0.4852 (d6) | 1.5348 (Nd6) | 55.66 (vd6) | 5.15 (= f6) |
| 13* | −5.6427 (r12) | 0.4922 (t6) | | | |
| 14* | −8.3712 (r13) | 0.3800 (d7) | 1.5348 (Nd7) | 55.66 (vd7) | −2.98 (= f7) |
| 15* | 2.0032 (r14) | 0.2178 | | | |
| 16 | Infinity | 0.2100 | 1.5630 | 51.30 | |
| 17 | Infinity | 0.5724 | | | |
| (Image Plane) | Infinity | | | | |

| Lens group data | Composite Focal Length | | Entrance Pupil Diameter | |
|---|---|---|---|---|
| 1st lens-2nd lens | 10.63 | (= f12) | 3.160 | (= EPD) |
| 2nd lens-3rd lens | 12.37 | (= f23) | | |
| 3rd lens-4th lens | 24.26 | (= f34) | | |
| 6th lens-7th lens | −11.72 | (= f67) | | |
| 5th lens-6th lens-7th lens | 21.03 | (= f567) | | |

Aspheric Surface Data

| | Second Surface | Third Surface | Fourth Surface | Fifth Surface | Sixth Surface |
|---|---|---|---|---|---|
| k | 0.00000E+00 | 0.00000E+00 | 0.00000E+00 | 0.00000E+00 | 0.00000E+00 |
| A4 | 4.35661E−04 | −3.95737E−02 | −1.08053E−01 | −9.49601E−02 | −3.94310E−02 |
| A6 | 7.94662E−03 | 2.82931E−03 | 1.55161E−02 | 6.86141E−03 | −1.84681E−02 |
| A8 | −1.20494E−02 | 1.20567E−02 | 3.07455E−02 | 3.23083E−02 | 9.71281E−03 |
| A10 | 8.09778E−03 | −1.49855E−02 | −3.00313E−02 | −2.53207E−02 | −1.11743E−02 |
| A12 | −2.67205E−03 | 6.36641E−03 | 1.24791E−02 | 9.15446E−03 | 5.88492E−03 |
| A14 | 2.49876E−04 | −9.50473E−04 | −1.82325E−03 | −1.04352E−03 | −9.18909E−04 |
| A16 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 |

| | Seventh Surface | Eighth Surface | Ninth Surface | Tenth Surface | Eleventh Surface |
|---|---|---|---|---|---|
| k | 0.00000E+00 | −6.31395E−01 | 0.00000E+00 | 5.34484E+00 | 0.00000E+00 |
| A4 | −2.38915E−02 | 7.26870E−02 | 6.81523E−02 | −3.19876E−02 | −3.58509E−02 |
| A6 | −2.38830E−02 | −7.22889E−02 | −7.84455E−02 | −2.49958E−02 | −1.52928E−02 |
| A8 | 2.52203E−03 | 4.15706E−02 | 7.02456E−02 | 3.20297E−02 | 1.60519E−02 |
| A10 | −1.95772E−03 | −1.11050E−02 | −3.53539E−02 | −1.95562E−02 | −7.25964E−03 |
| A12 | 3.08049E−03 | 1.96124E−03 | 1.03258E−02 | 5.77135E−03 | 1.63392E−03 |
| A14 | −7.86913E−04 | −5.95699E−04 | −1.73158E−03 | −8.14900E−04 | −1.71303E−04 |
| A16 | 0.00000E+00 | 1.19044E−04 | 1.40042E−04 | 4.51489E−05 | 6.64202E−06 |
| A18 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 |

TABLE 6-continued

Unit mm
f = 4.76
Fno = 1.51
ω(°) = 39.7
ih = 4.03
TTL = 6.33

|     | Twelfth Surface | Thirteenth Surface | Fourteenth Surface | Fifteenth Surface |
| --- | --- | --- | --- | --- |
| k   | −9.27766E−01 | 0.00000E+00 | 0.00000E+00 | −7.67567E+00 |
| A4  | 6.08419E−02 | 1.46101E−01 | −5.74338E−02 | −5.17823E−02 |
| A6  | −6.41421E−02 | −8.42042E−02 | −3.94004E−03 | 1.42476E−02 |
| A8  | 2.76620E−02 | 2.38245E−02 | 7.94277E−03 | −2.14860E−03 |
| A10 | −9.91470E−03 | −4.87384E−03 | −1.86828E−03 | 1.63861E−04 |
| A12 | 2.20501E−03 | 6.58142E−04 | 2.01977E−04 | −5.10399E−06 |
| A14 | −2.61909E−04 | −5.52377E−05 | −1.08369E−05 | −1.13326E−08 |
| A16 | 1.26923E−05 | 1.94732E−06 | 2.34039E−07 | 2.53578E−09 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

The imaging lens in Example 6 satisfies conditional expressions (1) to (18) as shown in Table 8.

Figure 12:
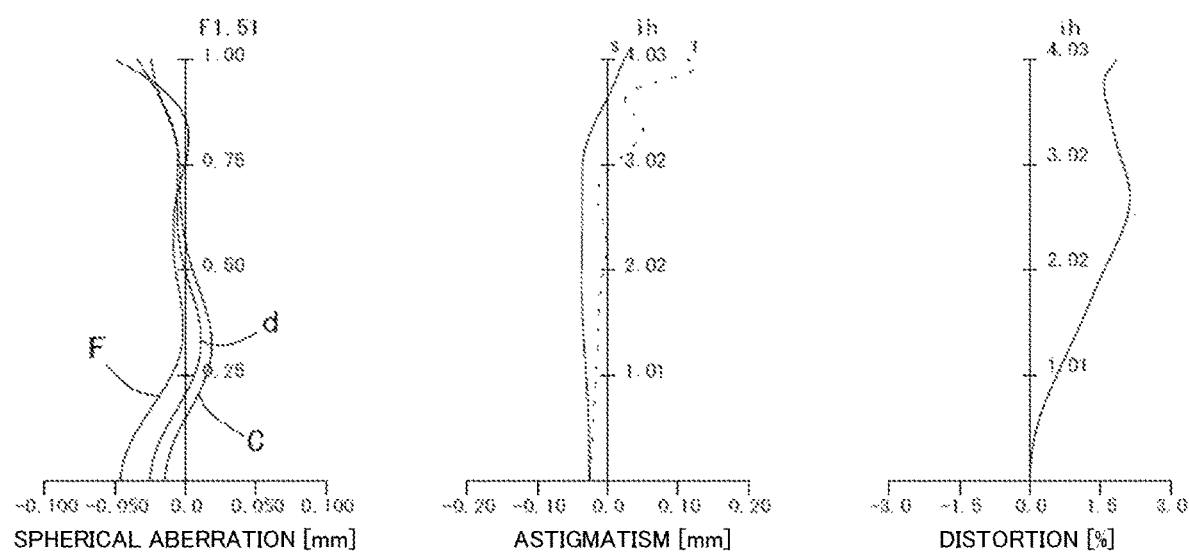
FIG. 12 shows spherical aberration, astigmatism, and distortion of the imaging lens in Example 6 according to the present invention.
Figure 13:
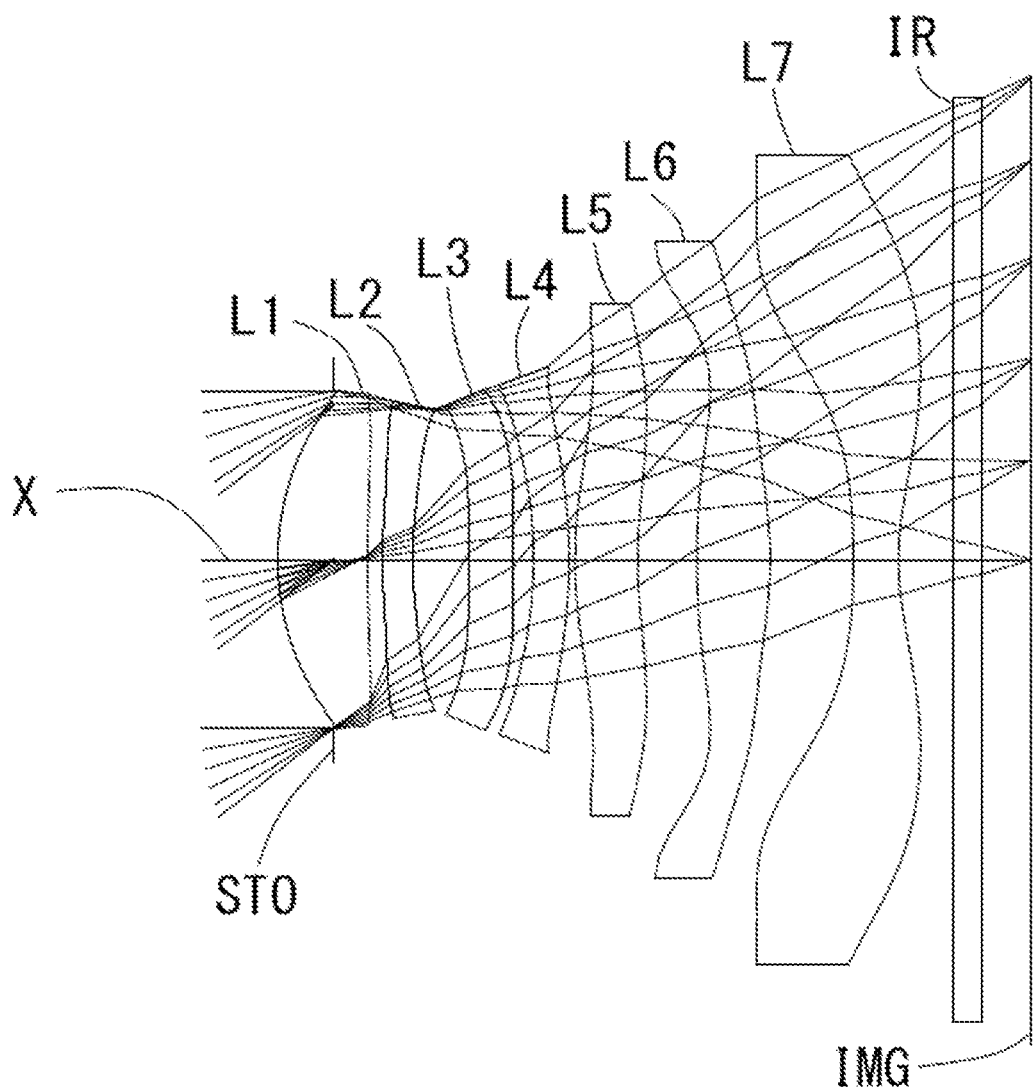
FIG. 13 is a schematic view showing the general configuration of an imaging lens in Example 7 according to the present invention.

FIG. 12 shows spherical aberration (mm), astigmatism (mm), and distortion (%) of the imaging lens in Example 6. As shown in FIG. 12, each aberration is corrected excellently.

Example 7

The basic lens data is shown below in Table 7.

TABLE 7

Unit mm
f = 4.44
Fno = 1.81
ω(°) = 38.0
ih = 3.53
TTL = 5.43

Surface Data

| Surface Number i | Curvature Radius r | Surface Distance d | Refractive Index Nd | Abbe Number vd | Focal Length |
| --- | --- | --- | --- | --- | --- |
| (Object) | Infinity | Infinity | | | |
| 1 (Stop) | Infinity | −0.4000 | | | |
| 2* | 1.9232 (r1) | 0.6548 (d1) | 1.5445 (Nd1) | 55.98 (vd1) | 4.65 (= f1) |
| 3* | 7.0407 (r2) | 0.1131 (t1) | | | |
| 4* | 4.0782 (r3) | 0.2200 (d2) | 1.6709 (Nd2) | 19.48 (vd2) | −21.11 (= f2) |
| 5* | 3.0977 (r4) | 0.4120 (t2) | | | |
| 6* | −42.2190 (r5) | 0.3250 (d3) | 1.6142 (Nd3) | 25.58 (vd3) | −42.76 (= f3) |
| 7* | 69.6969 (r6) | 0.1461 (t3) | | | |
| 8* | −2.9046 (r7) | 0.2600 (d4) | 1.6612 (Nd4) | 20.37 (vd4) | −25.62 (= f4) |
| 9* | −3.6305 (r8) | 0.0400 (t4) | | | |
| 10* | 2.7322 (r9) | 0.4603 (d5) | 1.5445 (Nd5) | 55.98 (vd5) | 17.76 (= f5) |
| 11* | 3.5818 (r10) | 0.4331 (t5) | | | |
| 12* | 6.9868 (r11) | 0.5346 (d6) | 1.5348 (Nd6) | 55.66 (vd6) | 3.82 (= f6) |
| 13* | −2.8146 (r12) | 0.6082 (t6) | | | |
| 14* | −6.3436 (r13) | 0.3300 (d7) | 1.5348 (Nd7) | 55.66 (vd7) | −2.53 (= f7) |
| 15* | 2.0227 (r14) | 0.1629 | | | |
| 16 | Infinity | 0.2100 | 1.5630 | 51.30 | |
| 17 | Infinity | 0.5928 | | | |
| (Image Plane) | Infinity | | | | |

| Lens group data | Composite Focal Length | | Entrance Pupil Diameter | |
| --- | --- | --- | --- | --- |
| 1st lens-2nd lens | 5.54 | (= f12) | 2.455 | (= EPD) |
| 2nd lens-3rd lens | −14.13 | (= f23) | | |
| 3rd lens-4th lens | −16.13 | (= f34) | | |
| 6th lens-7th lens | −86.93 | (= f67) | | |
| 5th lens-6th lens-7th lens | 15.81 | (= f567) | | |

TABLE 7-continued

Unit mm
f = 4.44
Fno = 1.81
ω(°) = 38.0
ih = 3.53
TTL = 5.43

Aspheric Surface Data

|     | Second Surface | Third Surface | Fourth Surface | Fifth Surface | Sixth Surface |
| --- | --- | --- | --- | --- | --- |
| k   | 0.00000E+00 | 0.00000E+00 | 0.00000E+00 | 0.00000E+00 | 0.00000E+00 |
| A4  | −5.05180E−03 | −1.13549E−01 | −2.29143E−01 | −1.63153E−01 | −1.16018E−01 |
| A6  | 1.60199E−02 | 1.36484E−01 | 2.82794E−01 | 1.96974E−01 | 2.41787E−03 |
| A8  | −1.48075E−02 | −1.17273E−01 | −2.14006E−01 | −1.29398E−01 | 3.42193E−02 |
| A10 | −3.55903E−04 | 5.34006E−02 | 1.05013E−01 | 5.80941E−02 | −4.24852E−03 |
| A12 | 6.34621E−03 | −1.00960E−01 | −2.14225E−02 | −8.09815E−03 | −3.19474E−02 |
| A14 | −3.25195E−03 | −6.82006E−04 | 0.00000E+00 | 0.00000E+00 | 1.69159E−02 |
| A16 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 |

|     | Seventh Surface | Eighth Surface | Ninth Surface | Tenth Surface | Eleventh Surface |
| --- | --- | --- | --- | --- | --- |
| k   | 0.00000E+00 | 0.00000E+00 | 0.00000E+00 | −3.91420E+00 | 0.00000E+00 |
| A4  | −9.6991E−02 | 1.35181E−01 | 8.48016E−02 | −1.17963E−01 | −9.18598E−02 |
| A6  | −1.50415E−01 | −4.59619E−01 | −2.19494E−01 | 8.77711E−02 | −1.42078E−02 |
| A8  | 3.82625E−01 | 8.67009E−01 | 4.43263E−01 | −2.32794E−02 | 5.74411E−02 |
| A10 | −3.45065E−01 | −8.61132E−01 | −4.94744E−01 | −1.91674E−02 | −4.42635E−02 |
| A12 | 1.28926E−01 | 4.48441E−01 | 2.98852E−01 | 1.59276E−02 | 1.63110E−02 |
| A14 | −1.55071E−02 | −1.14298E−01 | −9.14102E−02 | −4.21657E−03 | −2.91122E−03 |
| A16 | 0.00000E+00 | 1.08414E−02 | 1.11890E−02 | 3.80873E−04 | 2.00793E−04 |
| A18 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 |

|     | Twelfth Surface | Thirteenth Surface | Fourteenth Surface | Fifteenth Surface |
| --- | --- | --- | --- | --- |
| k   | 0.00000E+00 | 0.00000E+00 | 0.00000E+00 | −9.43512E+00 |
| A4  | 5.63840E−02 | 1.39612E−01 | −6.99805E−02 | −5.76787E−02 |
| A6  | −6.96246E−02 | −6.27864E−02 | 5.20049E−03 | 1.58162E−02 |
| A8  | 3.10810E−02 | 1.04869E−02 | 5.45324E−03 | −3.07035E−03 |
| A10 | −1.11376E−02 | 4.03327E−04 | −1.20350E−03 | 4.05778E−04 |
| A12 | 2.59125E−03 | −2.78768E−04 | 6.27963E−05 | −4.05449E−05 |
| A14 | −3.05899E−04 | 2.06182E−05 | 4.33067E−06 | 2.89866E−06 |
| A16 | 1.38781E−05 | 0.00000E+00 | −3.98827E−07 | −9.75114E−08 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

The imaging lens in Example 7 satisfies conditional expressions (1) to (18) as shown in Table 8.

Figure 14:
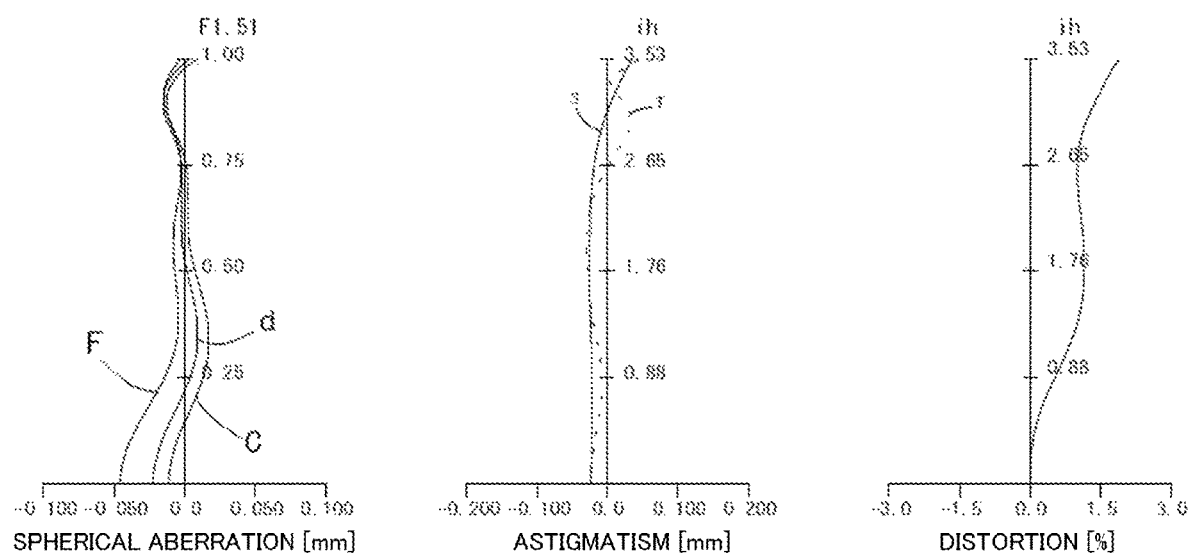
FIG. 14 shows spherical aberration, astigmatism, and distortion of the imaging lens in Example 7 according to the present invention.

FIG. 14 shows spherical aberration (mm), astigmatism (mm), and distortion (%) of the imaging lens in Example 7. As shown in FIG. 14, each aberration is corrected excellently.

In table 8, values of conditional expressions (1) to (18) related to the Examples 1 to 7 are shown.

TABLE 8

|     |     | Example1 | Example2 | Example3 | Example4 | Example5 | Example6 | Example7 |
| --- | --- | --- | --- | --- | --- | --- | --- | --- |
| Conditional Expression(1) | Nd1 | 1.5445 | 1.5445 | 1.5445 | 1.5445 | 1.5445 | 1.5445 | 1.5445 |
| Conditional Expression(2) | f2/f | −3.02 | −5.10 | −4.66 | −4.51 | −4.76 | −6.24 | −4.76 |
| Conditional Expression(3) | t2/t3 | 0.68 | 0.82 | 0.84 | 0.94 | 0.98 | 0.78 | 2.82 |
| Conditional Expression(4) | f567/f | 3.88 | 4.04 | 4.25 | 3.96 | 3.70 | 4.42 | 3.56 |
| Conditional Expression(5) | (r9 + r10)/(r9 − r10) | −5.07 | −2.31 | −7.02 | −7.00 | −7.45 | −0.87 | −7.43 |
| Conditional Expression(6) | |f23|/f | 2.23 | 2.10 | 2.24 | 2.24 | 2.35 | 2.60 | 3.18 |
| Conditional Expression(7) | t3/f | 0.09 | 0.08 | 0.08 | 0.08 | 0.08 | 0.09 | 0.03 |

TABLE 8-continued

|  |  | Example1 | Example2 | Example3 | Example4 | Example5 | Example6 | Example7 |
|---|---|---|---|---|---|---|---|---|
| Conditional Expression(8) | vd1 | 55.98 | 55.98 | 55.98 | 55.98 | 55.98 | 55.98 | 55.98 |
| Conditional Expression(9) | vd2 | 20.37 | 19.48 | 19.48 | 20.37 | 20.37 | 20.37 | 19.48 |
| Conditional Expression(10) | vd4 | 23.53 | 20.37 | 20.37 | 19.48 | 19.48 | 19.48 | 20.37 |
| Conditional Expression(11) | vd5 | 55.98 | 55.98 | 55.98 | 55.98 | 55.98 | 55.98 | 55.98 |
| Conditional Expression(12) | vd6 | 55.98 | 55.66 | 55.66 | 55.66 | 55.66 | 55.66 | 55.66 |
| Conditional Expression(13) | vd7 | 55.66 | 55.66 | 55.66 | 55.66 | 55.66 | 55.66 | 55.66 |
| Conditional Expression(14) | d1/f | 0.14 | 0.14 | 0.15 | 0.13 | 0.15 | 0.15 | 0.15 |
| Conditional Expression(15) | f12/f | 2.12 | 1.76 | 1.71 | 1.88 | 1.87 | 2.23 | 1.25 |
| Conditional Expression(16) | |f34|/f | 5.11 | 7.15 | 9.71 | 7.33 | 7.38 | 5.09 | 3.64 |
| Conditional Expression(17) | f5/f | 1.88 | 2.41 | 2.25 | 2.36 | 2.60 | 2.19 | 4.00 |
| Conditional Expression(18) | r1/r2 | 0.40 | 0.43 | 0.42 | 0.39 | 0.41 | 0.50 | 0.27 |

When the imaging lens according to the present invention is adopted to a product with the camera function, there is realized contribution to the low-profileness and the low F-number of the camera and also high performance thereof.

DESCRIPTION OF REFERENCE NUMERALS

STO: aperture stop,
L1: first lens,
L2: second lens,
L3: third lens,
L4: fourth lens,
L5: fifth lens,
L6: sixth lens,
L7: seventh lens,
ih: maximum image height,
IR: filter, and
IMG: image plane.

What is claimed is:

1. An imaging lens comprising in order from an object side to an image side,
a first lens having positive refractive power,
a second lens,
a third lens having negative refractive power,
a fourth lens,
a fifth lens having positive refractive power,
a sixth lens, and
a seventh lens, wherein said second lens has a convex surface facing the object side near the optical axis, an image-side surface of said seventh lens is aspheric, and the following conditional expressions (2a) and (16) are satisfied:

$$-7.1 < f2/f < -2.5 \quad (2a)$$

$$2.5 < |f34|/f < 12.0 \quad (16)$$

where
f: a focal length of the overall optical system,
f2: a focal length of the second lens, and
f34: a composite focal length of the third lens and the fourth lens.

2. The imaging lens according to claim 1, wherein the following conditional expression (3) is satisfied:

$$0.3 < t2/t3 < 3.3 \quad (3)$$

where
t2: a distance along the optical axis from an image-side surface of the second lens to an object-side surface of the third lens, and
t3: a distance along the optical axis from an image-side surface of the third lens to an object-side surface of the fourth lens.

3. The imaging lens according to claim 1, wherein the following conditional expression (5) is satisfied:

$$-10.0 < (r9+r10)/(r9-r10) < -0.5 \quad (5)$$

where
r9: a paraxial curvature radius of an object-side surface of the fifth lens, and
r10: a paraxial curvature radius of an image-side surface of the fifth lens.

4. The imaging lens according to claim 1, wherein the following conditional expression (6) is satisfied:

$$1.0 < |f23|/f < 4.5 \quad (6)$$

where
f23: a composite focal length of the second lens and the third lens.

5. The imaging lens according to claim 1, wherein the following conditional expression (7) is satisfied:

$$0.01 < t3/f < 0.15 \quad (7)$$

where
t3: a distance along the optical axis from an image-side surface of the third lens to an object-side surface of the fourth lens.

6. The imaging lens according to claim 1, wherein the following conditional expression (15) is satisfied:

$$1.0 < f12/f < 3.0 \quad (15)$$

where
f12: a composite focal length of the first lens and the second lens.

7. The imaging lens according to claim 1, wherein the following conditional expression (17) is satisfied:

$$1.7 < f5/f < 4.5 \quad (17)$$

where
f5: a focal length of the fifth lens.

8. An imaging lens comprising in order from an object side to an image side,
a first lens,
a second lens,
a third lens having negative refractive power,
a fourth lens,
a fifth lens,
a sixth lens, and
a seventh lens having negative refractive power, wherein the following conditional expressions (2a), (16) and (17) are satisfied:

$$-7.1 < f2/f < -2.5 \qquad (2a)$$

$$2.5 \leq |f34|/f < 12.0 \qquad (16)$$

$$1.7 < f5/f < 4.5 \qquad (17)$$

where
f: a focal length of the overall optical system,
f2: a focal length of the second lens,
f5: a focal length of the fifth lens, and
f34: a composite focal length of the third lens and the fourth lens.

9. The imaging lens according to claim 8, wherein the following conditional expression (3) is satisfied:

$$0.3 < t2/t3 < 3.3 \qquad (3)$$

where
t2: a distance along the optical axis from an image-side surface of the second lens to an object-side surface of the third lens, and
t3: a distance along the optical axis from an image-side surface of the third lens to an object-side surface of the fourth lens.

10. The imaging lens according to claim 8, wherein the following conditional expression (5) is satisfied:

$$-10.0 < (r9+r10)/(r9-r10) < -0.5 \qquad (5)$$

where
r9: a paraxial curvature radius of an object-side surface of the fifth lens, and
r10: a paraxial curvature radius of an image-side surface of the fifth lens.

11. The imaging lens according to claim 8, wherein the following conditional expression (6) is satisfied:

$$1.0 < |f23|/f < 4.5 \qquad (6)$$

where
f23: a composite focal length of the second lens and the third lens.

12. The imaging lens according to claim 8, wherein the following conditional expression (7) is satisfied:

$$0.01 < t3/f < 0.15 \qquad (7)$$

where
t3: a distance along the optical axis from an image-side surface of the third lens to an object-side surface of the fourth lens.

13. The imaging lens according to claim 8, wherein the following conditional expression (15) is satisfied:

$$1.0 < f12/f < 3.0 \qquad (15)$$

where
f12: a composite focal length of the first lens and the second lens.

14. An imaging lens comprising in order from an object side to an image side,
a first lens,
a second lens,
a third lens having negative refractive power,
a fourth lens,
a fifth lens having positive refractive power,
a sixth lens, and
a seventh lens having negative refractive power, wherein the following conditional expressions (2a) and (16) are satisfied:

$$-7.1 < f2/f < -2.5 \qquad (2a)$$

$$2.5 < |f34|/f < 12.0 \qquad (16)$$

where
f: a focal length of the overall optical system,
f2: a focal length of the second lens, and
f34: a composite focal length of the third lens and the fourth lens.

15. The imaging lens according to claim 14, wherein the following conditional expression (3) is satisfied:

$$0.3 < t2/t3 < 3.3 \qquad (3)$$

where
t2: a distance along the optical axis from an image-side surface of the second lens to an object-side surface of the third lens, and
t3: a distance along the optical axis from an image-side surface of the third lens to an object-side surface of the fourth lens.

16. The imaging lens according to claim 14, wherein the following conditional expression (5) is satisfied:

$$-10.0 < (r9+r10)/(r9-r10) < -0.5 \qquad (5)$$

where
r9: a paraxial curvature radius of an object-side surface of the fifth lens, and
r10: a paraxial curvature radius of an image-side surface of the fifth lens.

17. The imaging lens according to claim 14, wherein the following conditional expression (6) is satisfied:

$$1.0 < |f23|/f < 4.5 \qquad (6)$$

where
f23: a composite focal length of the second lens and the third lens.

18. The imaging lens according to claim 14, wherein the following conditional expression (7) is satisfied:

$$0.01 < t3/f < 0.15 \qquad (7)$$

where
t3: a distance along the optical axis from an image-side surface of the third lens to an object-side surface of the fourth lens.

19. The imaging lens according to claim 14, wherein the following conditional expression (15) is satisfied:

$$1.0 < f12/f < 3.0 \qquad (15)$$

where
f12: a composite focal length of the first lens and the second lens.

20. The imaging lens according to claim 14, wherein the following conditional expression (17) is satisfied:

$$1.7 < f5/f < 4.5 \tag{17}$$

where
f5: a focal length of the fifth lens.

* * * * *